US012810385B2

(12) United States Patent
Lee et al.

(10) Patent No.: US 12,810,385 B2
(45) Date of Patent: Nov. 24, 2026

(54) METHOD FOR GENERATING SUPER-RESOLUTION VIDEO USING MULTI-CAMERA VIDEO TRIPLETS AND DEVICE FOR THE SAME

(71) Applicant: POSTECH Research and Business Development Foundation, Pohang-si (KR)

(72) Inventors: Seung Yong Lee, Pohang-si (KR); Sung Hyun Cho, Pohang-si (KR); Jun Yong Lee, Pohang-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 136 days.

(21) Appl. No.: 18/396,411

(22) Filed: Dec. 26, 2023

(65) Prior Publication Data

US 2024/0212093 A1 Jun. 27, 2024

(30) Foreign Application Priority Data

Dec. 27, 2022 (KR) ........................ 10-2022-0186476
Dec. 4, 2023 (KR) ........................ 10-2023-0173699

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC ............................ G06T 3/4053; G06T 3/4046
See application file for complete search history.

(56) References Cited

U.S. PATENT DOCUMENTS 11,288,782 B2 3/2022 Lee et al.
11,928,799 B2 3/2024 Chopra et al.
(Continued)

FOREIGN PATENT DOCUMENTS

KR 1020210035369 A 4/2021
KR 1020220001417 A 1/2022

OTHER PUBLICATIONS

Zhang et al, Enhanced Bidirectional Propagation Network for Video Super-Resolution, 2021, 7th International Conference on Computer and Communications, pp. 1-6. (Year: 2021).*
(Continued)

*Primary Examiner* — Kathleen M Broughton
(74) *Attorney, Agent, or Firm* — Morgan, Lewis & Bockius LLP

(57) ABSTRACT

A method for generating a super-resolution video by using a multi-camera video may comprise: generating a resolution-improved ultra-wide-angle video frame at an arbitrary time step by inputting an ultra-wide-angle video frame of a first resolution at the arbitrary time step, ultra-wide-angle video frames right before and right after the arbitrary time step, and a wide-angle video frame for reference at the arbitrary time step, to a bidirectional neural network, wherein the generating of the resolution-improved ultra-wide-angle video frame is performed using accumulated information at a past time step based on the arbitrary time step, and accumulated information at a future time step based on the arbitrary time step, and wherein a second resolution, which is a resolution of the generated ultra-wide-angle video frame, is greater than the first resolution.

18 Claims, 16 Drawing Sheets

(56) References Cited

U.S. PATENT DOCUMENTS

| | | | | |
|---|---|---|---|---|
| 2021/0090222 | A1* | 3/2021 | Lee | G06T 1/20 |
| 2021/0097646 | A1* | 4/2021 | Choi | G06N 3/08 |
| 2024/0114107 | A1* | 4/2024 | Park | G06T 3/4038 |

OTHER PUBLICATIONS

Suluhan et al, Dual Camera High Spatio-Temporal Resolution Video Generation For Wide Area Surveillance, 2022, 18th IEEE International Conference on Advanced Video and Signal Based Surveillance, pp. 1-9. (Year: 2022).*
Huang et al, Bidirectional Recurrent Convolutional Networks for Multi-Frame Super-Resolution, 2015, Advances in Neural Information Processing systems 28, pp. 1-10 (Year: 2015).*
Zhu et al, Deep Recurrent Neural Network with Multi-scale Bi-directional Propagation for Video Deblurring, 2021, arXiv:2112.051v1, pp. 1-9. (Year: 2021).*
Zheng, et al., CrossNet: An End-to-end Reference-based Super Resolution Network using Cross-scale Warping, Computer Vision—ECCV 2018, pp. 87-104, Lecture Notes i11 Computer Science book series. (LNIP, vol. 11210).
Shim, et al., Robust Reference-based Super-Resolution with Similarity-Aware Deformable Convolution, 2020 IEEE/CVF Conference on Computer Vision and Pattern Recognition (CVPR), pp. 8425-8434.
Barnes, et al., PatchMatch: A Randomized Correspondence Algorithm for Structural Image Editing, Seminal Graphics Papers: Pushing the Boundaries, vol. 2, Aug. 2023, Article No. 65, pp. 619-629.
Xie, et al., Feature Representation Matters: End-to-End Learning for Reference-based Image Super-resolution, Computer Vision—ECCV 2020, pp. 230-245, Lecture Notes in Computer Science book series (LNIP, volme 12349).
Yang, et al., Learning1 Texture Transformer Network for Image Super-Resolution, 2020 IEEE/CVF Conference on Computer Vision and Pattern Recognition (CVPR), pp. 5791-5800.
Wang, et al., Dual-Camera Super-Resolution with Aligned Attention Modules, 2021 IEEE/CVF International Conference on Computer Vision (ICCV).
Wang, et al., EDVR: Video Restoration with Enhanced Deformable Convolutional Networks, 2019 IEEE/CVF Conference on Computer Vision and Pattern Recognition Workshops (CVPRW).
Li, et al., MuCAN: Multi-Correspondence Aggregation Network for Video Super-Resolution, Computer Vision—ECCV 2020, pp. 335-351.
Tian, et al., TDAN: Temporally-Deformable Alignment Network for Video Super-Resolution, 2020 IEEE/CVF Conference on Computer Vision and Pattern Recognition (CVPR), pp. 3360-3369.
Chan, et al., BasicVSR: The Search for Essential Components in Video Super-Resolution and Beyond, 2021 IEEE/CVF Conference on Computer Vision and Pattern Recognition (CVPR), pp. 4947-4956.
Huang, et al., Bidirectional Recurrent Convolutional Networks for Multi-Frame Super-Resolution, NIPS'15: Proceedings of the 28th International Conference on Neural Information Processing Systems—vol. 1, Dec. 2015, pp. 235-243.
Zhang, et al., Image Super-Resolution Using Very Deep Residual Channel Attention Networks, Computer Vision—ECCV 2018, pp. 294-310, Lecture Notes in Computer Science book series (LNIP, vol. 11218).
Mechrez, et al., The Contextual Loss for Image Transformation with Non-Aligned Data, Computer Vision—ECCV 2018, pp. 800-815, Lecture Notes in Computer Science book series (LNIP, vol. 11218).

* cited by examiner

| $\ell_{Mfid}$ | PTF | PSNR↑ | SSIM↑ | Params (M) |
|---|---|---|---|---|
| | | 30.71 | 0.894 | 4.2768 |
| ✓ | | 31.31 | 0.913 | 4.2768 |
| ✓ | ✓ | **31.68** | **0.914** | 4.2772 |

FIG. 13

| | Model | PSNR↑ | SSIM↑ | Params (M) |
|---|---|---|---|---|
| SISR | Bicubic | 26.65 | 0.800 | - |
| | SRGAN [13] | 29.38 | 0.877 | 0.734 |
| | RCAN-$\ell_1$ [12] | 31.07 | 0.915 | 15.89 |
| RefSR | TTSR [5] | 30.31 | 0.905 | 6.730 |
| | TTSR-$\ell_1$ [5] | 30.83 | 0.911 | 6.730 |
| | DCSR [6] | 30.63 | 0.895 | 5.419 |
| | DCSR-$\ell_1$ [6] | 32.43 | 0.933 | 5.419 |
| VSR | EDVR-M-$\ell_{ch}$ [7] | 33.26 | 0.946 | 3.317 |
| | EDVR-$\ell_{ch}$ [7] | 33.47 | 0.948 | 20.63 |
| | BasicVSR-$\ell_{ch}$ [10] | 33.66 | 0.951 | 4.851 |
| | IconVSR-$\ell_{ch}$ [10] | 33.80 | 0.951 | 7.255 |
| RefVSR | Ours-*small* | 31.63 | 0.912 | 1.052 |
| | Ours-*small*-$\ell_1$ | 33.88 | 0.951 | 1.052 |
| | Ours | 31.68 | 0.914 | 4.277 |
| | Ours-$\ell_1$ | 34.74 | 0.958 | 4.277 |
| | Ours-IR | 31.73 | 0.916 | 4.774 |
| | Ours-IR-$\ell_1$ | **34.86** | **0.959** | 4.774 |

FIG. 14

| | Model | PSNR / SSIM measured for regions in the indicated FoV range | | | | | | Params (M) |
|---|---|---|---|---|---|---|---|---|
| | | 0%~50% | 50%~60% | 50%~70% | 50%~80% | 50%~90% | 50%~100% | |
| **SISR** | Bicubic | 25.38 / 0.757 | 26.30 / 0.785 | 26.42 / 0.789 | 26.71 / 0.798 | 26.99 / 0.801 | 27.29 / 0.815 | - |
| | RCAN-$\ell_1$ [12] | 29.77 / 0.895 | 30.69 / 0.908 | 30.86 / 0.910 | 31.17 / 0.914 | 31.50 / 0.918 | 31.80 / 0.921 | 15.89 |
| **RefSR** | DCSR-$\ell_1$ [ 8 ] | 34.90 / 0.963 | 31.96 / 0.927 | 31.61 / 0.921 | 31.58 / 0.919 | 31.81 / 0.921 | 31.93 / 0.923 | 5.419 |
| **VSR** | IconVSR-$\ell_{cb}$ [10] | 32.79 / 0.946 | 33.43 / 0.949 | 33.60 / 0.950 | 33.89 / 0.951 | 34.19 / 0.953 | 34.40 / 0.953 | 7.255 |
| **RefVSR** | Ours-$\ell_1$ | 36.02 / 0.971 | 34.59 / 0.958 | 34.31 / 0.956 | 34.23 / 0.954 | 34.40 / 0.955 | 34.50 / 0.954 | 4.277 |
| | Ours-IR-$\ell_1$ | **36.14 / 0.971** | **34.66 / 0.959** | **34.40 / 0.956** | **34.34 / 0.955** | **34.52 / 0.955** | **34.63 / 0.955** | 4.774 |

METHOD FOR GENERATING SUPER-RESOLUTION VIDEO USING MULTI-CAMERA VIDEO TRIPLETS AND DEVICE FOR THE SAME

CROSS-REFERENCE TO RELATED APPLICATIONS

This application claims priority to Korean Patent Applications No. 10-2022-0186476, filed on Dec. 27, 2022, and No. 10-2023-0173699, filed on Dec. 4, 2023, with the Korean Intellectual Property Office (KIPO), the entire contents of which are hereby incorporated by reference.

BACKGROUND

1. Technical Field

Exemplary embodiments of the present disclosure relate to a method for generating a reference-based super-resolution video using a multi-camera video, and a device for the same, and more specifically, to a technique for converting an ultra-wide-angle video of an arbitrary resolution into an ultra-wide-angle video of an improved resolution using accumulated information of past time points and future time points of a video.

2. Related Art

Reference-based super-resolution (RefSR), in which reference images are used to restore images of low resolution (LR) to images of high resolution (HR), has been widely studied.

The studies on conventional RefSR methods have been focused on the establishment of local correlations between low resolution features and reference features. Some examples of the methods of establishing correlation between the features include an offset-based matching method and a patch-based matching method.

Studies on conventional VSR methods have been focused on how to effectively use low-resolution frames which are out of alignment in the video sequence. Depending on how the low-resolution frames in the video sequence are processed by the model, the existing VSR methods may be classified into a sliding window-based VSR framework or a recurrent framework-based VSR framework. In order to handle low-resolution frames which are not aligned, a warping technique, which uses an optical flow, a patch-based correlation technique, and a deformable convolution technique, have been used.

A variety of components have been developed through conventional studies on RefSR and VSR. Herein, prior art documents about the learnable patch-match-based reference alignment technique disclose matching reference features with low-resolution features and align them. In addition, a VSR framework technology based on recurrent framework is disclosed.

SUMMARY

Exemplary embodiments of the present disclosure are directed to providing a method for generating a super-resolution video using a multi-camera video and a device for the same. Here, the multi-camera video may be a video which is photographed using an ultra-wide-angle, a wide-angle, and a telephoto lens of an asymmetrical triple camera of a smartphone.

On the other hand, in the past, a video with a different field of view (FoV) was not used as a reference to improve the resolution of a video. Exemplary embodiments of the present disclosure are directed to providing a method and device for improving resolution of an ultra-wide-angle video by using a video, which has a field of view (FoV) other than that of the ultra-wide-angle video, as a reference, that is, by utilizing a video taken using a wide-angle camera and a telephoto camera.

Further, exemplary embodiments of the present disclosure are directed to providing a technology for improving a reference-based video super-resolution (RefVSR) applicable to a multi-camera video taken in an asymmetric multi-camera system by expanding RefSR scheme to a video.

On the other hand, when expanding the RefSR to a video, the method of applying RefSR by frames may be implemented most simply. However, this method may require too many calculations (operations), so it is practically impossible to be implemented. Therefore, exemplary embodiments of the present disclosure are directed to providing a method for generating a resolution-improved video by effectively utilizing a temporal feature of a wide-angle video, which is a reference input video, by accumulating a confidence map, which is calculated for alignment of ultra-wide-angle frames and reference frames, at past time points and future time points for resolution improvement, and a device for the same.

According to a first exemplary embodiment of the present disclosure, a method for generating a super-resolution video by using a multi-camera video may comprise: generating a resolution-improved ultra-wide-angle video frame at an arbitrary time point by inputting an ultra-wide-angle video frame of a first resolution at the arbitrary time point, ultra-wide-angle video frames right before and right after the arbitrary time point, and a wide-angle video frame for reference at the arbitrary time point, to a bidirectional neural network, wherein the generating of the resolution-improved ultra-wide-angle video frame is performed using accumulated information at a past time point based on the arbitrary time point, and accumulated information at a future time point based on the arbitrary time point, and wherein a second resolution, which is a resolution of the generated ultra-wide-angle video frame, is greater than the first resolution.

The bidirectional neural network may be trained by a two-step supervised learning scheme, and the method may further comprise: training the bidirectional neural network, by an advance supervised learning scheme, to allow the bidirectional neural network to generate the ultra-wide-angle video frame of the second resolution at the arbitrary time point, by inputting ultra-wide-angle video frames at the arbitrary time point and time points right before and right after the arbitrary time point, which have been down-sampled by predetermined scaling factors, and the wide-angle video frame at the arbitrary time point to the bidirectional neural network; and training the trained bidirectional neural network, by an adaptive supervised learning scheme, to allow the bidirectional neural network to generate the ultra-wide-angle video frame of the second resolution at the arbitrary time point, by inputting ultra-wide-angle video frames of the first resolution at the arbitrary time point and time points right before and right after the arbitrary time point, and the wide-angle video frame at the arbitrary time point to the trained bidirectional neural network.

The training of the bidirectional neural network by the advance supervised learning scheme may comprise: training the bidirectional neural network to output an ultra-wide-angle video frame of the second resolution by inputting ultra-wide-angle video frames at the arbitrary time point and time points right before and right after the arbitrary time point, which have been down-sampled by the predetermined scaling factors, and the wide-angle video frame at the arbitrary time point, to the bidirectional neural network, using a down-sampled wide-angle video frame, which is generated by down-sampling the wide-angle video frame at the arbitrary time point by second predetermined scaling factors, as a second ground truth, and wherein the training of the bidirectional neural network by the advance supervised learning scheme comprises: generating a second loss function value by comparing the ultra-wide-angle video frame at the arbitrary time point, which is output by the bidirectional neural network, with the second ground truth; and providing the second loss function value to the bidirectional neural network.

The training of the bidirectional neural network by the advance supervised learning scheme may further comprise: training the bidirectional neural network to output an ultra-wide-angle video frame of the second resolution by inputting ultra-wide-angle video frames at the arbitrary time point and time points right before and right after the arbitrary time point, which have been down-sampled by the predetermined scaling factors, and the wide-angle video frame at the arbitrary time point, to the bidirectional neural network, using the ultra-wide-angle video frame at the arbitrary time point, as a first ground truth, wherein the training of the bidirectional neural network by the advance supervised learning scheme comprises: generating a first loss function value by comparing the ultra-wide-angle video frame at the arbitrary time point, which is output by the bidirectional neural network, with the first ground truth; and providing the first loss function value to the bidirectional neural network.

The training of the bidirectional neural network by the adaptive supervised learning scheme may comprise: training the trained bidirectional neural network to output an ultra-wide-angle video frame of the second resolution by inputting ultra-wide-angle video frames at the arbitrary time point and time points right before and right after the arbitrary time point, and the wide-angle video frame at the arbitrary time point, to the bidirectional neural network, using the ultra-wide-angle video frame of the first resolution at the arbitrary time point, as a third ground truth, wherein the training of the bidirectional neural network by the adaptive supervised learning scheme comprises: down-sampling the ultra-wide-angle video frame at the arbitrary time point, which is output by the trained bidirectional neural network, by the predetermined scaling factors; generating a third loss function value by comparing the down-sampled ultra-wide-angle video frame with the third ground truth; and providing the third loss function value to the bidirectional neural network.

The training of the trained bidirectional neural network by the adaptive supervised learning scheme may comprise: training the trained bidirectional neural network to output an ultra-wide-angle video frame of the second resolution by inputting ultra-wide-angle video frames at the arbitrary time point and time points right before and right after the arbitrary time point, and the wide-angle video frame at the arbitrary time point, to the bidirectional neural network, using telephoto video frame at the arbitrary time point, as a fourth ground truth, wherein the training of the bidirectional neural network by the adaptive supervised learning scheme comprises: generating a fourth loss function value by comparing the ultra-wide-angle video frame at the arbitrary time point with the fourth ground truth; and providing the fourth loss function value to the bidirectional neural network.

The bidirectional neural network may include a forward cell and a backward cell, wherein in an operation of calculating the forward cell, a forward propagation intermediate feature and a forward propagation confidence map, which are accumulated information of the past time point, are delivered to the forward cell, and ultra-wide-angle video frames of the first resolution at the arbitrary time point, and the time points right before and right after the arbitrary time point, and the wide-angle video frame at the arbitrary time point are input to the forward cell, and the forward propagation intermediate feature and the forward propagation confidence map are at the arbitrary time point are calculated and output, and wherein in an operation of calculating the backward cell, a backward propagation intermediate feature and a backward propagation confidence map, which are accumulated information of the future time point, are delivered to the backward cell, and ultra-wide-angle video frames at the arbitrary time point, and the time points right before and right after the arbitrary time point, and the wide-angle video frame at the arbitrary time point are input to the backward cell, and the backward propagation intermediate feature and the backward propagation confidence map are at the arbitrary time point are calculated and output.

The bidirectional neural network may further include an upsampling module, wherein in an operation of generating an ultra-wide-angle video frame of the second resolution by the upsampling module, the forward propagation intermediate feature, the forward propagation confidence map, the backward propagation intermediate feature, and the backward propagation confidence map at the arbitrary time point are input to the upsampling module, and the upsampling module generates the ultra-wide-angle video frame of the second resolution.

The forward propagation intermediate feature among information accumulated at the past time point, and the backward propagation intermediate feature among information accumulated at the future time point may be values aggregated in the forward cell and the backward cell of all time points before the arbitrary time point, respectively, and wherein an ultra-wide-angle feature for the ultra-wide-angle video frame of the first resolution of each time point, and a wide-angle feature for the wide-angle video frame of each time point are fused and aggregated in the forward propagation intermediate feature and the backward propagation intermediate feature.

The forward propagation confidence map among information accumulated at the past time point, and the backward propagation confidence map among information accumulated at the future time point may be values aggregated in the forward cell and the backward cell of all time points before the arbitrary time point, respectively.

According to a second exemplary embodiment of the present disclosure, a device for generating a super-resolution video by using a multi-camera video, the device may comprise: a processor; and a bidirectional neural network, wherein the processor generates a resolution-improved ultra-wide-angle video frame sequence at an arbitrary time step by inputting an ultra-wide-angle video frame of a first resolution at the arbitrary time step, ultra-wide-angle video frames right before and right after the arbitrary time step, and a wide-angle video frame for reference at the arbitrary time step, to the bidirectional neural network, wherein, when generating the resolution-improved ultra-wide-angle video frame sequence, the processor generates the ultra-wide-angle video frame sequence using accumulated information of a past time step and a future time step based on an arbitrary time step, and wherein a second resolution, which is a resolution of the generated ultra-wide-angle video frame sequence, is greater than the first resolution.

The processor may be configured to: train the bidirectional neural network, by an advance supervised learning scheme, to allow the bidirectional neural network to generate the ultra-wide-angle video frame sequence of the second resolution at the arbitrary time step, by inputting ultra-wide-angle video frames at the arbitrary time step and time steps right before and right after the arbitrary time step, which have been down-sampled by predetermined scaling factors, and the wide-angle video frame at the arbitrary time step to the bidirectional neural network; and train the trained bidirectional neural network, by an adaptive supervised learning scheme, to allow the bidirectional neural network to generate the ultra-wide-angle video frame sequence of the second resolution at the arbitrary time step, by inputting ultra-wide-angle video frames of the first resolution at the arbitrary time step and time steps right before and right after the arbitrary time step, and the wide-angle video frame at the arbitrary time step to the trained bidirectional neural network.

In the advance supervised learning scheme of the bidirectional neural network, the processor may be configured to train the bidirectional neural network to output an ultra-wide-angle video frame sequence of the second resolution by inputting ultra-wide-angle video frames at the arbitrary time step and time steps right before and right after the arbitrary time step, which have been down-sampled by the predetermined scaling factors, and the wide-angle video frame at the arbitrary time step, to the bidirectional neural network, using a down-sampled wide-angle video frame, which is generated by down-sampling the wide-angle video frame at the arbitrary time step by second predetermined scaling factors, as a second ground truth, wherein when the processor trains the bidirectional neural network by the advance supervised learning scheme, the processor is configured to: generate a second loss function value by comparing the ultra-wide-angle video frame at the arbitrary time step, which is output by the bidirectional neural network, with the second ground truth; and provide the second loss function value to the bidirectional neural network.

In the advance supervised learning scheme of the bidirectional neural network, the processor may be configured to allow the bidirectional neural network to output an ultra-wide-angle video frame of the second resolution by inputting ultra-wide-angle video frames at the arbitrary time step and time steps right before and right after the arbitrary time step, which have been down-sampled by the predetermined scaling factors, and the wide-angle video frame at the arbitrary time step, to the bidirectional neural network, using the ultra-wide-angle video frame at the arbitrary time step, as a first ground truth, wherein when the processor trains the bidirectional neural network by the advance supervised learning scheme, the processor is configured to: generate a first loss function value by comparing the ultra-wide-angle video frame at the arbitrary time step, which is output by the bidirectional neural network, with the first ground truth; and provide the first loss function value to the bidirectional neural network.

In an operation of training the trained bidirectional neural network by the adaptive supervised learning scheme, the processor may be configured to allow the trained bidirectional neural network to output an ultra-wide-angle video frame of the second resolution by inputting ultra-wide-angle video frames at the arbitrary time step and time steps right before and right after the arbitrary time step, and the wide-angle video frame at the arbitrary time step, to the bidirectional neural network, using the ultra-wide-angle video frame of the first resolution at the arbitrary time step, as a third ground truth, wherein when the processor trains the trained bidirectional neural network by the adaptive supervised learning scheme, the processor is configured to: down-sample the ultra-wide-angle video frame at the arbitrary time step, which is output by the trained bidirectional neural network, by the predetermined scaling factors; generate a third loss function value by comparing the down-sampled ultra-wide-angle video frame with the third ground truth; and provide the fourth loss function value to the bidirectional neural network.

In an operation of training the trained bidirectional neural network by the adaptive supervised learning scheme, the processor may be configured to train the trained bidirectional neural network to output an ultra-wide-angle video frame of the second resolution by inputting ultra-wide-angle video frames at the arbitrary time step and time steps right before and right after the arbitrary time step, and the wide-angle video frame at the arbitrary time step, to the bidirectional neural network, using a telephoto video frame at the arbitrary time step, as a fourth ground truth, and wherein when the processor trains the bidirectional neural network by the adaptive supervised learning scheme, the processor is configured to: generate a fourth loss function value by comparing the ultra-wide-angle video frame at the arbitrary time step with the fourth ground truth; and provide the fourth loss function value to the bidirectional neural network.

The bidirectional neural network may include a forward cell and a backward cell, wherein the processor may be configured to allow a forward propagation intermediate feature and a forward propagation confidence map, which are accumulated information of the past time step, to be delivered to the forward cell, and ultra-wide-angle video frames of the first resolution at the arbitrary time step, and the time steps right before and right after the arbitrary time step, and the wide-angle video frame at the arbitrary time step to be input to the forward cell, and allow the forward cell to calculate and output the forward propagation intermediate feature and the forward propagation confidence map at the arbitrary time step, and wherein the processor may be configured to allow a backward propagation intermediate feature and a backward propagation confidence map, which are accumulated information of the future time step, to be delivered to the backward cell, and ultra-wide-angle video frames at the arbitrary time step, and the time steps right before and right after the arbitrary time step, and the wide-angle video frame at the arbitrary time step to be input to the backward cell, and allow the backward cell to calculate and output the backward propagation intermediate feature and the backward propagation confidence map at the arbitrary time step.

The bidirectional neural network may further include an upsampling module, wherein when the processor may control the upsampling module to generate an ultra-wide-angle video frame of a second resolution, which is resolution-improved by the predetermined scaling factors, and wherein the forward propagation intermediate feature, the forward propagation confidence map, the backward propagation intermediate feature, and the backward propagation confidence map at the arbitrary time step may be input to the upsampling module to generate an ultra-wide-angle video frame of the second resolution.

The forward propagation intermediate feature among information accumulated at the past time step, and the backward propagation intermediate feature among information accumulated at the future time step may be values aggregated in the forward cell and the backward cell of all time steps before the arbitrary time step, respectively, and wherein an ultra-wide-angle feature for the ultra-wide-angle video frame of the first resolution of each time step, and a wide-angle feature for the wide-angle video frame of each time step may be fused and aggregated in the forward propagation intermediate feature and the backward propagation intermediate feature.

The forward propagation confidence map among information accumulated at the past time step, and the backward propagation confidence map among information accumulated at the future time step may be values aggregated in the forward cell and the backward cell of all time steps before the arbitrary time step, respectively.

According to exemplary embodiments of the present disclosure, it is possible to provide a method for generating a super-resolution video which utilizes a multi-camera video, and a device for the same.

Further, according to exemplary embodiments of the present disclosure, it is possible to provide a method and device for improving resolution of an ultra-wide-angle video by using a video, which has a field of view (FoV) other than that of the ultra-wide-angle video, as a reference, that is, by utilizing a video taken using a wide-angle camera and a telephoto camera.

Further, according to exemplary embodiments of the present disclosure, it is possible to provide a reference-based video resolution improvement technique which may be applicable to a multi-camera video taken in an asymmetric multi-camera system by expanding RefSR scheme to video.

Further, according to exemplary embodiments of the present disclosure, it is possible to provide a convolution neural network structure for efficiently aligning a high resolution neural network feature (i.e., reference feature) of a wide-angle video frame, which is a reference, as a neural network feature of an ultra-wide-angle video frame, and utilizing the same.

Further, according to exemplary embodiments of the present disclosure, it is possible to provide a method for effectively utilizing a temporal feature of a wide-angle video, which is a reference input video, by accumulating the confidence map, which is calculated for alignment of an ultra-wide-angle frame and a reference frame, for past time points and future time points based on an arbitrary time point using the confidence map for improvement of resolution, and a device for the same.

Further, according to exemplary embodiments of the present disclosure, it is possible to provide a bidirectional recurrent neural network structure, which utilizes a wide-angle and telephoto video as a reference video, for improvement of resolution of an ultra-wide-angle, which reflects characteristics that the higher the focal length of the asymmetrical triple camera of a smartphone, the higher the resolution of the video obtained and the narrower the angle of the video.

Further, according to exemplary embodiments of the present disclosure, it is possible to provide a method for learning the structure of a neural network for improvement of resolution of an ultra-wide-angle video frame, and a two-step neural network training method for effective utilization of a reference video frame.

Further, according to exemplary embodiments of the present disclosure, it is possible to provide a method which allows a neural network to more effectively utilize a reference feature through a second loss function and a propagative temporal fusion module.

BRIEF DESCRIPTION OF DRAWINGS

FIG. 13 is a table showing a comparison of performance with the conventional technologies according to an exemplary embodiment of the present disclosure.

FIG. 14 is a table showing a comparison of the quantitative results measured in another FOV range as a comparison of the conventional technique and the present disclosure according to an exemplary embodiment of the present disclosure.

DETAILED DESCRIPTION OF THE EMBODIMENTS

Figure 1:
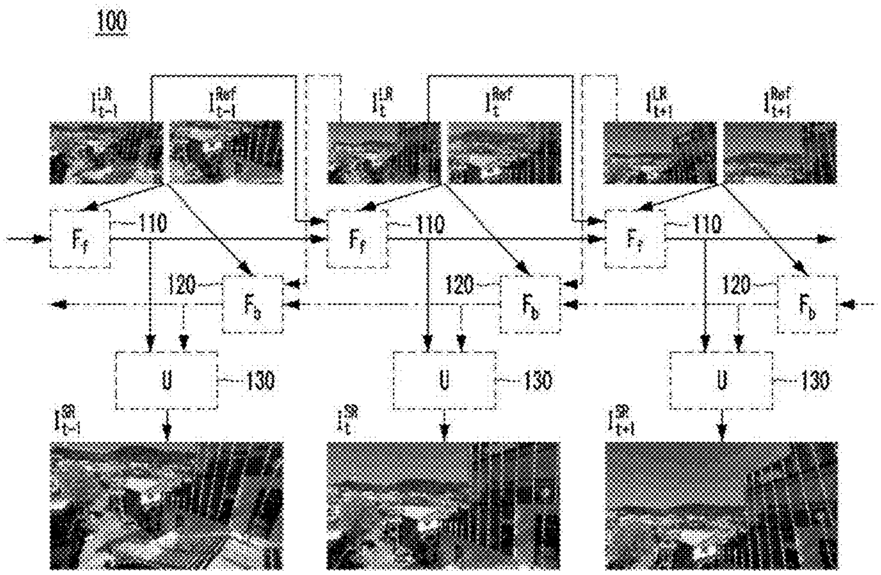
FIG. 1 is a schematic diagram illustrating a neural network structure for generating a super-resolution video using a multi-camera video according to an exemplary embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

RefVSR of the present invention contains the objectives of both conventional RefSR and VSR and uses a reference video to restore high-resolution (HR) video from low-resolution (LR) video. At this time, the low resolution means that the resolution is relatively lower than that of other videos, and may not mean that the resolution is absolutely low.

In order to apply RefVSR to video captured in an asymmetric multi-camera system, it is necessary to consider the relationship between low-resolution frames and reference frames within the video sequence.

Low-resolution frames and reference frames of the same time step share almost the same contents within the overlapping FoV. Additionally, since video includes camera or object movement, neighboring reference frames may have content useful for reconstructing areas other than the overlapping FoV. Considering this relationship between low-resolution frames and reference frames, the present invention proposes an end-to-end learning-based RefVSR network.

Unlike conventional methods, the present invention provides a VSR framework based on a recurrent framework that enables the use of reference videos. The present invention applies a propagative temporal fusion module to the RefVSR framework to effectively and efficiently use temporal reference features.

FIG. 1 is a schematic diagram illustrating a neural network structure for generating a super-resolution video using a multi-camera video according to an exemplary embodiment of the present disclosure.

The neural network 100 may be, for example, a bidirectional neural network (bidirectional recurrent neural network).

The neural network 100 may include a forward radio wave cell 110 (Ff) (hereinafter, referred to as "forward cell"), a backward radio wave cell 120 (Fb) (hereinafter, referred to as "backward cell"), and an upsampling module 130 (U).

A frame sequence $$\left(I_1^{LR}, \ldots, I_t^{LR}, \ldots, I_N^{LR}\right)$$

of an ultra-wide-angle video (LR video) and a frame sequence $$\left(I_1^{Ref}, \ldots, I_t^{Ref}, \ldots, I_N^{Ref}\right)$$

of a wide-angle video, which is a reference video, are input to the neural network 100. Here, "N" means the total number of frames of each video. The neural network 100 outputs a super-resolution video frame sequence $$\left(I_1^{SR}, \ldots, I_t^{SR}, \ldots, I_N^{SR}\right),$$

in which the resolution of frames of the ultra-wide-angle video has been improved by predetermined scaling factors (e.g., 4 times), as a result.

For example, arbitrary time step (t) may mean a specific time step of the video taken. Therefore, the improvement of the resolution for the video frame at the current time step may mean the improvement of the video frame of the already taken video at a specific time step. Past time steps in the present disclosure may mean time steps of frames taken before the arbitrary time step (t), and future time steps in the present disclosure may mean time steps of frames taken after the arbitrary time step (t).

For example, if it is assumed that the resolution (e.g., the first resolution, original/low resolution) of the ultra-wide-angle video frame $$\left(I_t^{LR}\right)$$

at an arbitrary time step (t) is improved, it may be as follows. an ultra-wide-angle video frame $(I_t^{LR})$ at the arbitrary time step (t), an ultra-wide-angle video frame $(I_{t-1}^{LR})$ at a (past) time step (t−1) right before the arbitrary time step (t), an ultra-wide-angle video frame $(I_{t+1}^{LR})$ at a (future) time step (t+1) right after the arbitrary time step (t), and a wide-angle video frame $(I_t^{Ref})$ at the arbitrary time step (t) for reference may be input to the neural network 100. In addition, the neural network 100 may generate an ultra-wide-angle video frame $(I_t^{SR})$ of a second resolution (upscaled/high resolution), in which the resolution has been improved by predetermined scaling factors (e.g., 4 times). Here, the wide-angle video frame may also be referred to as a reference (video) frame.

For example, cameras mounted on a recent mobile device (smartphone) is produced as a system composed of at least two or more asymmetrical multi-cameras. For example, in an environment of three or more asymmetric multi-camera systems, each ultra-wide-angle lens, wide-angle lens, and telephoto lens have a different field of view (FoV) and a different optical zoom factor. The neural network 100 using such multiple cameras according to the present disclosure may improve the resolution of a video acquired from an ultra-wide-angle camera of the lowest resolution by referring to videos acquired through wide-angle and telephoto cameras of a relatively good image quality, among videos acquired through ultra-wide-angle, wide-angle and telephoto cameras. For example, the magnification of the wide-angle video and telephoto video of the original one may be 2 and 4, respectively, based on the ultra-wide-angle.

Here, the neural network 100 may have been learned using accumulated information at a past timepoint and accumulated information at a future time step, based on an arbitrary time step (t).

Here, the forward propagation intermediate feature $(h_{t-1}^f)$ among information accumulated at the past time step, and the backward propagation intermediate feature $(h_{t+1}^b)$ among information accumulated at the future time step may be values aggregated in the forward cell 110 and the backward cell 120 of all time steps before the arbitrary time step, respectively.

Further, the forward propagation (matching) confidence map $(c_{t-1}^f)$ among information accumulated at the past time step, and the backward propagation confidence map $(c_{t+1}^b)$ among information accumulated at the future time step may be values aggregated in the forward cell 110 and the backward cell 120 of all time steps before the arbitrary time step, respectively. At this time, the values calculated for aligning the reference video frame and the ultra-wide-angle video frame of the first resolution (original resolution) may be reflected in the confidence map.

The forward cell 110 is a bidirectional recurrent cell and may mean a forward propagation branch. A cell right before or right after the arbitrary time step (t) among the forward cells 110 may be referred to as a neighbor recurrent cell.

The forward propagation intermediate feature $(h_{t-1}^f)$ and the forward propagation confidence map $(c_{t-1}^f)$, which are aggregated at past time steps based on the arbitrary time step (t), are delivered to the forward cells 110, and ultra-wide-angle video frames of the first resolution at the arbitrary time step (t), and time steps right before and after that, and wide-angle video frames at the arbitrary time step (t) are input to the forward cells 110, so that the forward cells 110 may calculate and generate (output) the forward propagation intermediate feature $(h_t^f)$ at the arbitrary time step (t) and the forward propagation confidence map $(c_t^f)$ at the arbitrary time step (t).

The backward cell 120 is a bidirectional recurrent cell and may mean a backward propagation branch. A cell right before or right after the arbitrary time step (t) among the backward cells 120 may be referred to as a neighbor recurrent cell.

The backward propagation intermediate feature $$(h_{t+1}^b)$$

and the backward propagation confidence map $$(c_{t+1}^b),$$

which are aggregated at future time steps based on the arbitrary time step (t), are delivered to the backward cells 120, and ultra-wide-angle video frames of the first resolution at the arbitrary time step (t), and time steps right before and after that, and wide-angle video frames at the arbitrary time step (t) are input to the backward cells 120, so that the backward cells 120 may calculate and generate (output) the backward propagation intermediate feature $$(h_t^b)$$

at the arbitrary time step (t) and the backward propagation confidence map $$(c_t^b)$$

at the arbitrary time step (t).

The forward propagation intermediate feature $$(h_t^f)$$

at the arbitrary time step (t), the forward propagation confidence map $$(c_t^f),$$

the backward propagation intermediate feature $$(h_t^b),$$

and the backward propagation confidence map $$(c_t^b)$$

may be input to the upsampling module 130, and the upsampling module 130 may then an ultra-wide-angle video frame of the second resolution.

Specifically, upsampling module 130 may combine the forward propagation intermediate feature $$(h_t^f)$$

at the arbitrary time step (t), the forward propagation confidence map $$(c_t^f),$$

the backward propagation intermediate feature $$(h_t^b),$$

and the backward propagation confidence map $$(c_t^b)$$

with a convolution layer using a pixel-shuffle layer, thereby generating an upsampled, resolution-improved ultra-wide-angle video frame.

In the present invention, the term "time step" may be understood as a time point which is determined by a grid. Therefore, a term "time point" described below may be understood as the same feature as "time step".

The neural network 100 of the present disclosure may have been trained through a two-step supervised learning.

For example, the RealMCVSR dataset using a multi video for two-step supervised learning may be as follows.

The RealMCVSR dataset may be real-HD video triplets which were recorded simultaneously by smartphones (e.g., iPhone 12 Pro Max) having an ultra-wide-angle lens (30 mm), a wide-angle lens (59 mm), and a telephoto lens (147 mm) of a fixed focal distance. In order to use the video triplets as the dataset of the present disclosure, the inventor of the present disclosure developed an application for adjusting the exposure parameters (shutter speed and ISO) of each of the cameras. At this time, the camera was set to automatic exposure mode to record each video of the dataset. In the mode, the shutter speed of the three cameras (ultra-wide-angle, wide-angle, telephoto) is synchronized so that the three cameras have the same amount of motion blur. ISO is adjusted to have the same exposure value according to the camera. Each video is stored in MOV format using HEVC/M.265 encoding and has an HD resolution of 1080×1920. The RealMCVSR dataset consists of 161 video clips having 23,107 frames. They are divided into training, validation, and testing sets and consist of 137 video clips of 19,426 frames, 8 video clips of 1,141 frames, and 16 video clips of 2,540 frames, respectively.

Figure 2:
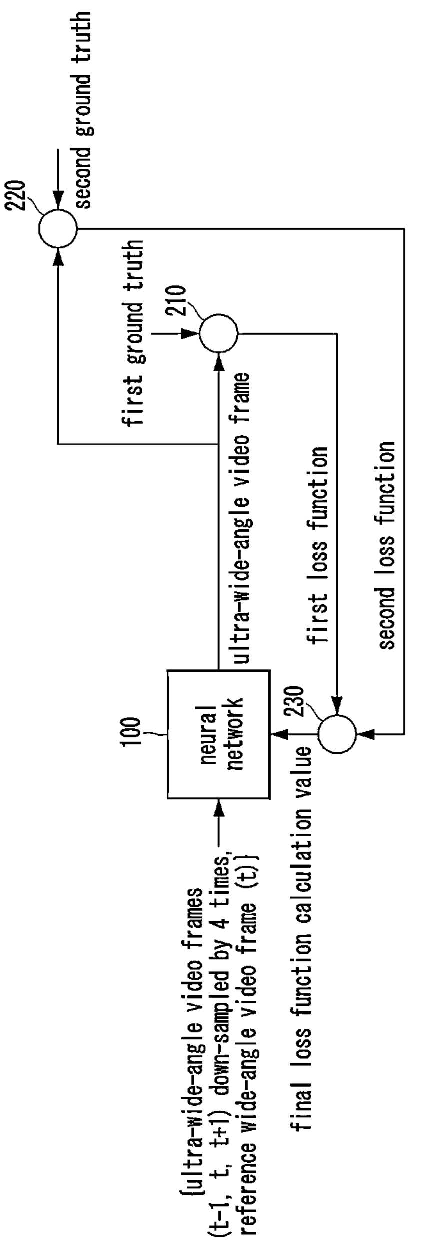
FIG. 2 is a diagram illustrating a supervised learning of a neural network according to an exemplary embodiment of the present disclosure.

FIG. 2 is a diagram illustrating a supervised learning of a neural network according to an exemplary embodiment of the present disclosure.

For example, the supervised learning of the neural network according to FIG. 2 may be a first supervised learning among the above-described two-step supervised learning. In other words, the first supervised learning may be a process of training the neural network to receive an ultra-wide-angle video frame and output an ultra-wide-angle video frame with a four times improved resolution. The supervised learning in the present disclosure is characterized in being a supervised learning based on a reference video frame.

Figure 3:
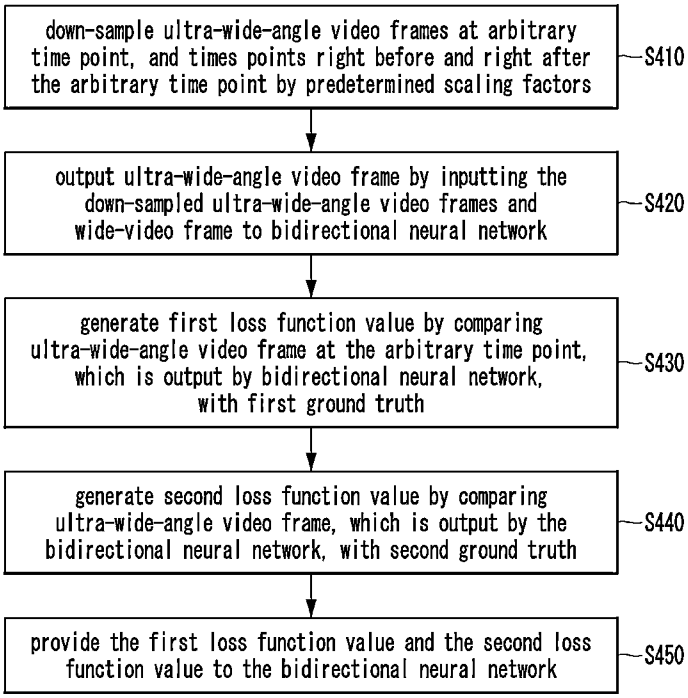
FIG. 3 is a flowchart illustrating a supervised learning process of a neural network according to an exemplary embodiment of the present disclosure.

FIG. 3 is a flowchart illustrating a supervised learning process of a neural network according to an exemplary embodiment of the present disclosure.

The following description will be made with reference to FIGS. 1 to 3.

The supervised learning through the following steps is meaningful in allowing the neural network 100 to learn the super-resolution.

In a step S410, ultra-wide-angle video frames $$(I_t^{LR}, I_{t-1}^{LR}, I_{t+1}^{LR})$$

at an arbitrary time point (t), a time point (t−1) right before the arbitrary time point (t), and a time point (t+1) right after the arbitrary time point (t) may be down-sampled by predetermined scaling factors (e.g., 4 times). At this time, the ultra-wide-angle video frames before the down sampling are the original ultra-wide-angle video frames taken by a camera of an ultra-wide-angle lens and may have the first resolution.

In a step S420, the down-sampled ultra-wide-angle video frames, and wide-angle video frames $$(I_t^{Ref})$$

at the arbitrary time point (t) may be input to the neural network 100, to thereby output the ultra-wide-angle video frame at the arbitrary time point (t). At this time, the wide-angle video frame may be an original wide-angle video frame taken with a camera having a wide-angle lens.

In a step S430, a first comparison unit 210 may generate the value of a first loss function by comparing the ultra-wide-angle video frame $$(I_t^{SR})$$

at the arbitrary time point (t), which is output by the neural network 100, with a first ground truth (GT)

$$(I_t^{HR}).$$

For example, the first ground truth (GT) may be the original ultra-wide-angle video frame at the arbitrary time point (t). At this time, the first loss function has a significance in that the neural network 100 can learn the super-resolution through the first ground truth (that is, video). That is, the first loss function value may be a reconfiguration value which may be used for the neural network 100 to restore the general texture and structure which are necessary for improvement of resolution.

At this time, Equation 1 of the first loss function may be as follows.

$$l_{rec} = \left\| I_{t,blur}^{SR} - I_{t,blur}^{HR} \right\| + \lambda_{rec} \sum_i \delta_i\left(I_t^{SR}, I_t^{HR}\right) \quad \text{[Equation 1]}$$

Here, "blur" means Gaussian blur filtering, and the size of the Gaussian kernel is 3×3, and the standard deviation is set to σ=1.0. In the second term of the Equation, $\delta_i(X, Y)=\min_j D(x_i, y_j)$ means a contextual loss, and it minimizes the difference between the pixel value at each pixel location $x_i$ of the image (or picture) X, and the pixel value at the pixel location $y_j$ of the closest image (or picture) Y. A perceptual distance is used to measure distance D between two pixels. In the equation, 0.01 is used for $\lambda_{rec}$.

In a step S440, a second comparison unit 220 may generate the value of a second loss function by comparing the ultra-wide-angle video frame $$(I_t^{SR})$$

at the arbitrary time point (t), which is output by the neural network 100, with a second ground truth (GT)

$$(I_t^{RefHR}).$$

For example, the second ground truth (GT) may be a reference map frame which is obtained by down-sampling the original wide-angle video frame at the arbitrary time point (t) by second predetermined scaling factors (e.g., 2 times). That is, the magnification of the ultra-wide-angle video frame at the arbitrary time point (t), which is output by the neural network 100, may be the same as the magnification of the down-sampled wide-angle video frame.

Here, the second loss function may be a loss function for inducing the neural network 100 to use the temporal reference frame. In other words, the second loss function effectively uses the feature for the wide-angle video frame (the temporal reference feature which has been aggregated from the neural network cell (RNN cell) of the previous time point by RAP to be described later) among bidirectional features (ultra-wide-angle feature and wide-angle feature) flowing in the neural network 100, for the ultra-wide-angle video frame, which is the output of the neural network, and induces the temporal reference feature to be propagated to the next neural network cell. As a result, the effect of the input (higher resolution) may be obtained by using the feature of the wide-angle video frames aggregated from the past or the future at an arbitrary time point (t) even though wide-angle video frames at past or future time points are input to the neural network 100 at an arbitrary time point (t).

For example, the overlapping field of view (FoV) is not directly compared for two video frames (ultra-wide-angle, wide-angle), and all patches of the two video frames are cut in, for example, 10×10 units, and the all patches are compared. Here, a wide-angle video frame is used to induce values with a high matching value, i.e., a high confidence map, to be selected and used. At this time, the induction may be performed by the second loss function ($l_{Mfid}$).

At this time, Equation 2 of the second loss function (multi-Ref fidelity loss, $l_{Mfid}$) may be as follows.

$$l_{Mfid} = \frac{\sum_{t'\in\Omega} \sum_i \delta_i\left(I_t^{SR}, I_t^{RefHR}\right) \cdot c_{t',i}}{\sum_{t'\in\Omega} \sum_i c_{t',i}} \quad \text{[Equation 2]}$$

At this time, in the Equation, $$\Omega = \left[t - \frac{k-1}{2}, \ldots, t + \frac{k-1}{2}\right]$$

may mean the window of the temporal reference frame. $c_{t',i}$ means the matching confidence calculated to obtain $$\delta_i\left(I_t^{SR}, I_t^{RefHR}\right). \; I_t^{RefHR}$$

means the above reference map frame.

In a step S450, a first loss function determination unit 230 may generate the final loss function value by adding the value of the first loss function and the value the second loss function, and provide the final loss function value to the neural network 100. Here, the final supervised learning loss function, which uses the first loss function and the second loss function, may be shown as in Equation 3 below.

$$l_{pre} = l_{rec}\left(I_t^{SR}, I_t^{HR}\right) + \lambda_{pre} l_{Mfid}\left(I_t^{SR}, I_{t\epsilon\Omega}^{RefHR}\right), \quad \text{[Equation 3]}$$

Here, $\lambda_{pre}$ may be 0.05.

Figure 4:
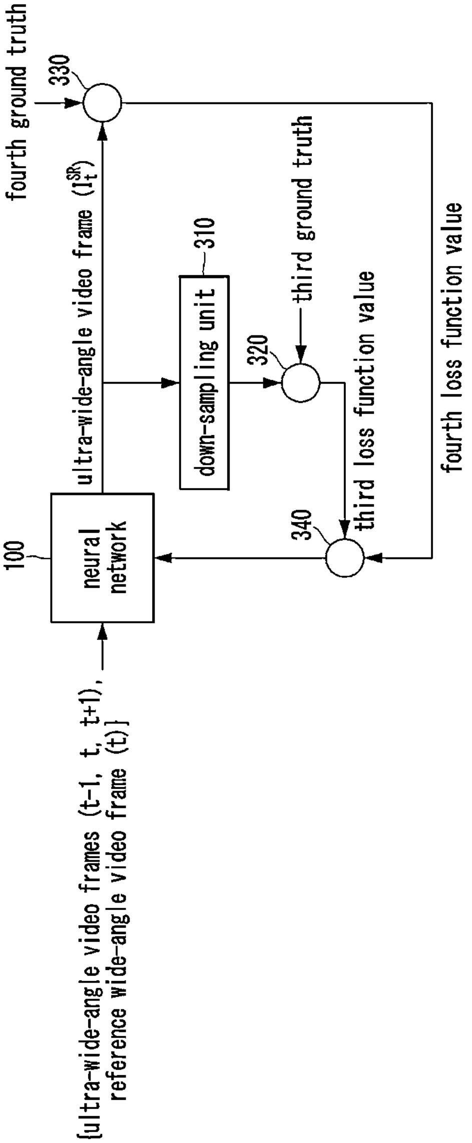
FIG. 4 is a diagram illustrating a supervised learning of a neural network according to an exemplary embodiment of the present disclosure.

FIG. 4 is a diagram illustrating a supervised learning of a neural network according to an exemplary embodiment of the present disclosure.

For example, the supervised learning of the neural network according to FIG. 4 may be a second supervised learning among the above-described two-step supervised learning. Here, the neural network used in the second supervised learning may be a neural network which has completed the first supervised learning.

When original video frames, which have not been down-sampled, are input to the neural network trained by the first supervised learning, super-resolution is not applied well due to the domain difference between the original video frames and down-sampled input video frames which were used in the supervised learning. In the present disclosure, in order to solve this problem, an original video adaptive learning (hereinafter, referred to as "second supervised learning") is applied to the network which has been trained by a supervised learning. Here, the second supervised learning may be a supervised learning to recover low frequency and high frequency details of a reference telephoto video to be described later.

Figure 5:
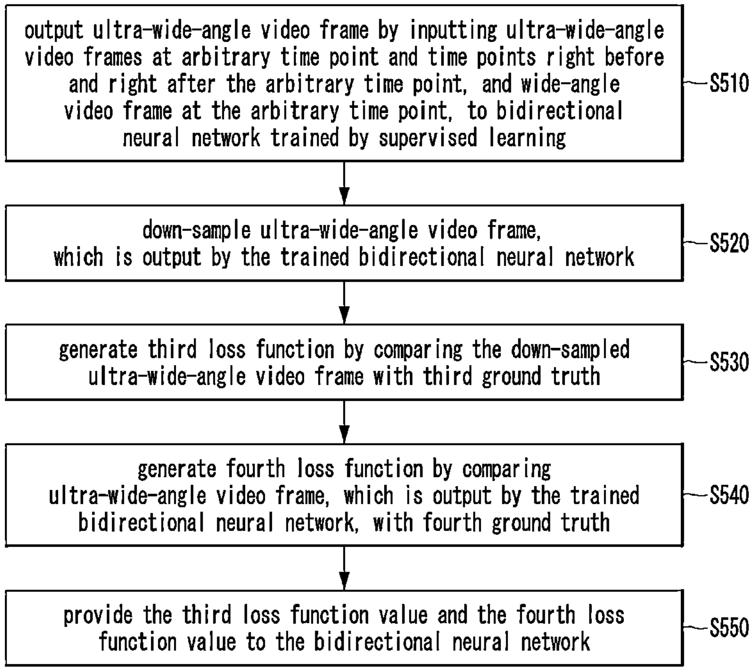
FIG. 5 is a flowchart illustrating a supervised learning process of a neural network according to an exemplary embodiment of the present disclosure.

FIG. 5 is a flowchart illustrating a supervised learning process of a neural network according to an exemplary embodiment of the present disclosure.

The following description will be made with reference to FIGS. 1, 4 and 5.

In a step S510, ultra-wide-angle video frames $$\left(I_t^{LR}, I_{t-1}^{LR}, I_{t+1}^{LR}\right)$$

at a time point (t−1) right before the arbitrary time point (t) and a time point (t+1) right after the arbitrary time point (t), and the wide-angle video frame $$\left(I_t^{Ref}\right)$$

at the arbitrary time point (t) are input to the neural network 100 trained by the supervised learning, to thereby output an ultra-wide-angle video frame $$\left(I_t^{SR}\right).$$

That is, the ultra-wide-angle video frames and the wide-angle video frame, which are input, may have been extracted from an original-size ultra-wide-angle video and an original-size wide-angle video.

In a step S520, a down-sampling unit 310 may down-sample ultra-wide-angle video frames, which are output by the neural network 100 trained by the supervised learning, by predetermined scaling factors (e.g., 4 times).

In a step S530, the third comparison unit 320 may generate the value of the third loss function by comparing the down-sampled ultra-wide-angle video frame with the third ground truth (GT) in the step S520. For example, the third ground truth (GT) may be the original ultra-wide-angle video frame $$\left(I_t^{LR}\right)$$

of the first resolution at the arbitrary time point (t). The third loss function may restore a low frequency. For example, the third loss function may be used to restore parts such as a symmetry structure of a building and the form of a person. The third loss function may be similar to the first loss function described above. At this time, Equation 4 of the third loss function may be as follows.

$$\left\| I_{t\downarrow,blur}^{SR} - I_{t,blur}^{UW} \right\| \quad \text{[Equation 4]}$$

At this time, $$I_{t\downarrow,blur}^{SR}$$

is a frame which is obtained by applying Gaussian kernel to the super-resolution result frame, which has been down-sampled by 4 times, and $$I_{t,blur}^{UW}$$

is a frame which is obtained by applying Gaussian kernel to the original ultra-wide-angle frame.

In a step S540, a fourth comparison unit 220 may generate the value of a fourth loss function by comparing the ultra-wide-angle video frame at the arbitrary time point (t), which is output by the neural network 100 trained by a supervised learning, with a fourth ground truth (GT). For example, the fourth ground truth (GT) may be the original telephoto video frame $$\left(I_t^{Tele}\right)$$

at the arbitrary time point (t). The fourth loss function may restore a high frequency. For example, the fourth loss function may be used to restore parts such as a detailed window, the texture of a sidewalk block, and the texture of the hair. Here, the fourth loss function may be similar to the second loss function described above. Here, Equation 5 of the fourth loss function may be as follows.

$$l_{Mfid}\left(I_t^{SR}, I_{t\in\Omega}^{Tele}\right) \quad \text{[Equation 5]}$$

Here, $$I_{t\in\Omega}^{Tele}$$

may mean a telephoto video frame.

At this time, the reason for using the telephoto video frame as the fourth ground truth (GT) is that the telephoto frame has the same magnification as that of the output of a network, that is, the neural network 100 during the two-step learning.

In a step S550, the second loss function determination unit 340 may provide the third loss function value and the fourth loss function value to the neural network 100. Here, Equation 6 of the final supervised learning loss function, which uses the third loss function and the fourth loss function, may be as follows.

$$l_{8K} = \left\|I_{t\downarrow,blur}^{SR} - I_{t,blur}^{UW}\right\| + \lambda_{8K} l_{Mfid}\left(I_t^{SR}, I_{t\in\Omega}^{Tele}\right) \quad \text{[Equation 6]}$$

Here, $\lambda_{8K}$ may be 0.1.

Figure 6:
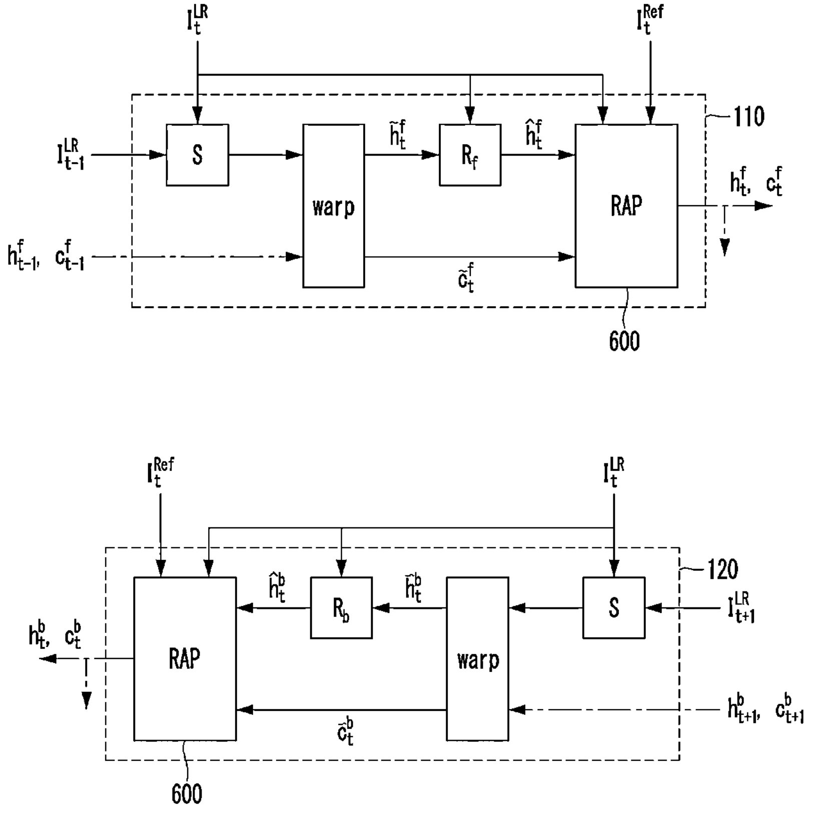
FIG. 6 is an internal configuration diagram of a forward cell and a backward cell according to an exemplary embodiment of the present disclosure.

FIG. 6 is an internal configuration diagram of a forward cell and a backward cell according to an exemplary embodiment of the present disclosure.

In order for the upsampling module U of FIG. 1 to accurately restore the resolution-improved ultra-wide-angle video frame $$\left(I_t^{SR}\right),$$

the intermediate feature $$\left(h_t^{\{f,b\}}\right),$$

which is generated in the forward cell 110 and the backward cell 120, should have detailed information integrated from both the ultra-wide-angle video frame and the reference frame. To this end, the forward cell 110 and the b cell 120 may include the following configuration.

Here, the configuration and internal flow of the forward cell 110 and the backward cell 120 may be the same except for the difference in input and output.

The forward cell 110 (and the backward cell 120) may include a flow estimation network (S), a warp, a residual convolution block (R), and a reference alignment and propagation (RAP) module 600.

In the forward cell 110 (or backward cell 120), the ultra-wide-angle video frame at an arbitrary time point (t) and the ultra-wide-angle video frame at a time point (t−1) right before the arbitrary time point (t) (or previous time point (t+1) based on the backward cell) are input to the flow estimation network S, so that the flow estimation network may estimate the optical flow between the ultra-wide-angle video frame at the arbitrary time point (t) and the ultra-wide-angle video frame at the previous time point (t−1) and generate the optical flow motion value.

The warp may align the propagated feature $$\left(h_{t-1}^f\right)$$

at the ultra-wide-angle video frame at the arbitrary time point (t) using the optical flow motion value. At this time, the feature about the ultra-wide-angle video frame at the current time point (t) may not yet be included in the aligned feature $$(\tilde{h}_t^f).$$

Meanwhile, the propagated matching confidence $$\left(c_{t-1}^f\right)\left(\text{or } c_{t+1}^b\right)$$

may be an accumulated matching confidence that was propagated in forward neighbor cells (or backward neighbor cells). The warp may generate the aligned matching confidence $$(\tilde{c}_{t-1}^f)\left(\text{or } \tilde{c}_t^b\right)$$

by aligning the propagated matching confidence $$\left(c_{t-1}^f\right)\left(\text{or } c_{t+1}^b\right)$$

in order to obtain the aligned matching confidence by using the optical flow calculated in the flow estimation network S.

The residual convolution block R may generate a temporally aggregated feature $$(\hat{h}_t^f)$$

by combining the ultra-wide-angle video frame at the arbitrary time point (t) with the aligned feature. Here, the temporally aggregated feature may include detailed information collected from a plurality of ultra-wide-angle features $$\left(h_1^{LR}, h_2^{LR}, \ldots, h_{t-1}^{LR}\right)$$

of a super-resolution (e.g., the second resolution higher than the first resolution), and temporal reference features (i.e.g, features of wide-angle video frame frames)

$$\left(h_1^{Ref}, h_2^{Ref}, \ldots, h_{t-1}^{Ref}\right),$$

which were propagated from a forward cell neighboring the forward cell 110 at the arbitrary time point (t) (e.g., a forward cell at time point t−1). Further, the temporally aggregated feature may additionally include the ultra-wide-angle feature $$(h_t^{LR})$$

for the ultra-wide-angle video frame $$(I_t^{LR})$$

at the current time point (t).

Figure 7:
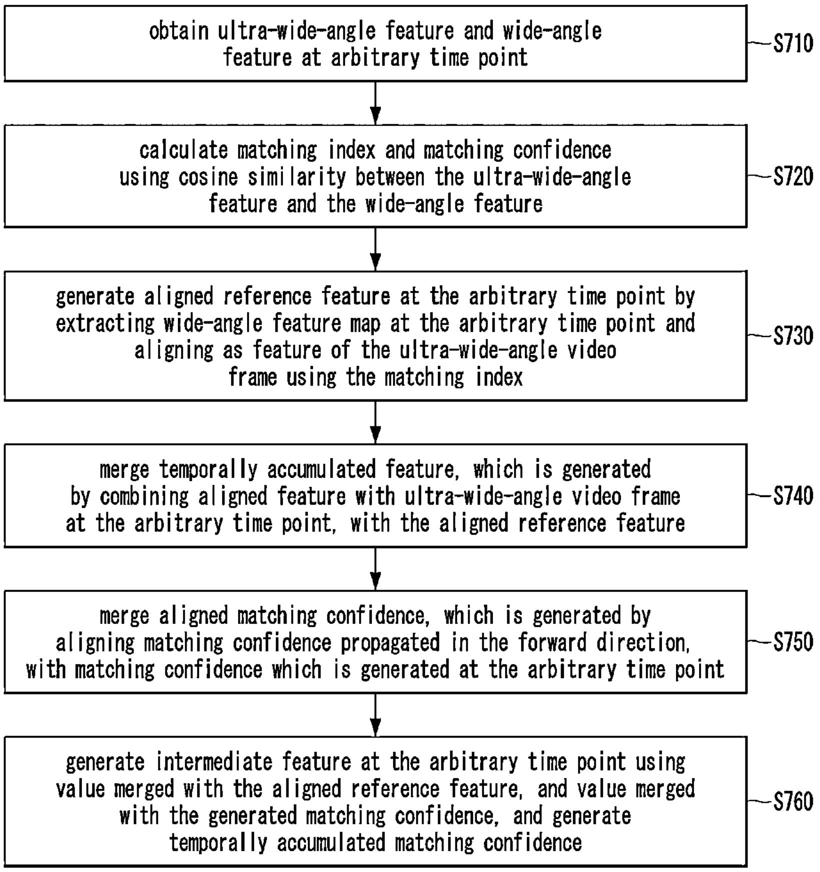
FIG. 7 is a flowchart illustrating the process of generating a matching confidence map and an intermediate feature propagated at an arbitrary time point according to an exemplary embodiment of the present disclosure.

FIG. 7 is a flowchart illustrating the process of generating a matching confidence map and an intermediate feature propagated at an arbitrary time point according to an exemplary embodiment of the present disclosure.

The steps below explain the schematic process based on the forward cell 110, and the steps in the backward cell 120 may be the same as the steps of the forward cell 110, except for the input value.

In a step S710, the ultra-wide-angle feature and the wide-angle feature at an arbitrary time point (t) may be obtained.

In a step S720, the matching index and the matching confidence may be calculated using the cosine similarity between the ultra-wide-angle feature and the wide-angle feature.

In a step S730, the aligned reference feature $$(\tilde{h}_t^{Ref})$$

at the arbitrary time point (t) may be generated by extracting the wide-angle feature map $$(h_t^{Ref})$$

(i.e., temporal reference feature) at the arbitrary time point (t), and aligning as the feature of the ultra-wide-angle video frame using the matching index.

In a step S740, the temporally aggregated feature $$(\hat{h}_t^f),$$

which is generated by combining the aligned feature with the ultra-wide-angle video frame at the arbitrary time point (t), may be concatenated with the aligned reference feature. At this time, the aligned feature may have been generated by aligning the forward propagation intermediate feature $$(h_{t-1}^f).$$

In a step S750, the aligned matching confidence $$(\tilde{c}_t^f),$$

which is generated by aligning the matching confidence $$(c_{t-1}^f)$$

propagated in the forward direction, may be concatenated with the matching confidence (ct) generated at the arbitrary time point (t).

In a step S760, an intermediate feature $$(h_t^f)$$

at the arbitrary time point (t) may be generated and a temporally accumulated matching confidence $$(c_t^f)$$

may be generated using the value concatenated in the step S740 and the value concatenated in the step S750.

Figure 8:
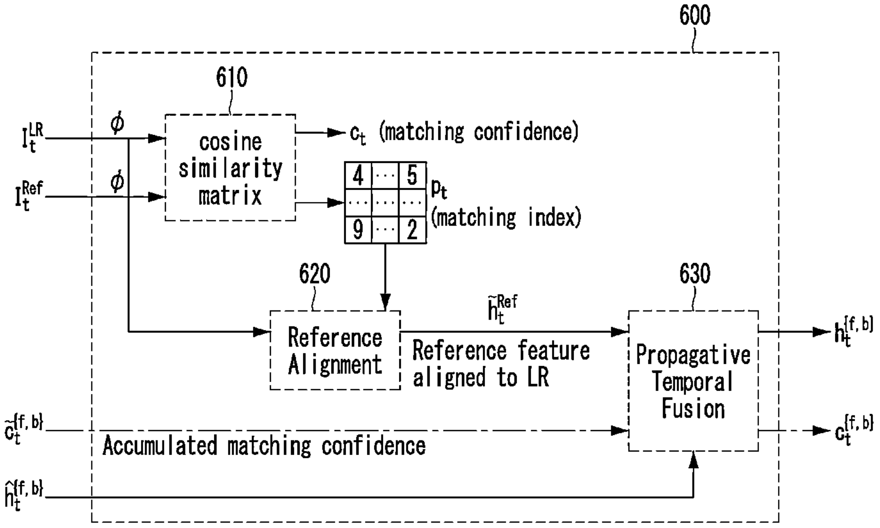
FIG. 8 shows the configuration and internal flow of the RAP module illustrated in FIG. 6.

FIG. 8 shows the configuration and internal flow of the RAP module illustrated in FIG. 6.

The RAP module 600 may include a cosine similarity matrix module 610, a reference alignment module 620, and a propagative temporal fusion module 630.

Figure 9:
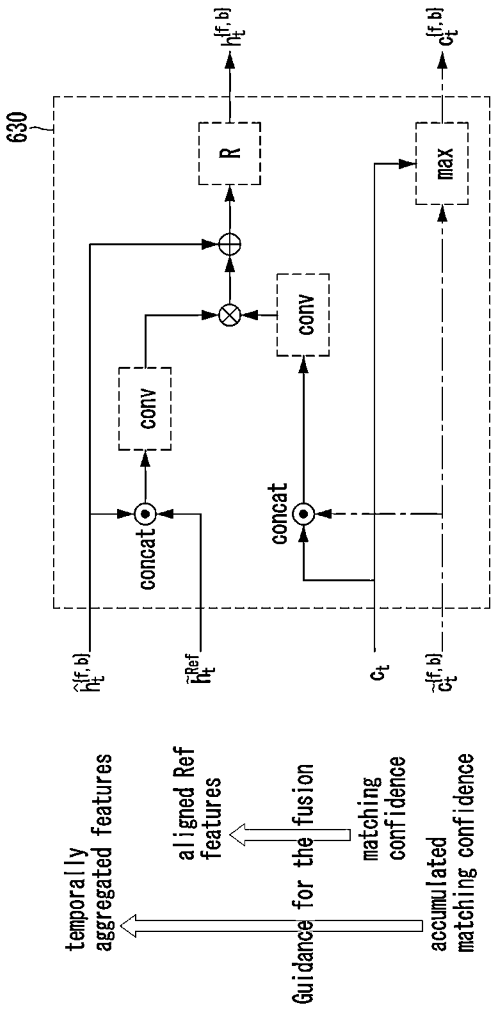
FIG. 9 shows the configuration and internal flow of the propagative temporal fusion module illustrated in FIG. 8.

FIG. 9 shows the configuration and internal flow of the propagative temporal fusion module illustrated in FIG. 8.

The configuration of FIGS. 8 and 9 may be included in both the forward cell and backward cell, respectively. Therefore, in FIGS. 8 and 9, {f and b} indicates the case corresponding to both forward direction and backward direction.

Hereinafter, the above-described steps will be described in more detail with reference to FIGS. 6, 8, and 9, and will be described based on the forward cell.

The RAP module 600 may align the temporal reference feature at the arbitrary time point (t) of the forward cells 100 (or backward cell cells 120) to the feature of the ultra-wide-angle video frame at the arbitrary time point (t), and fuse the aligned reference feature $$(\tilde{h}_t^{Ref})$$

with the propagated intermediate feature $$(h_{t-1}^f) \text{ or } (h_{t+1}^b)$$

at the previous time point. That is, the RAP module 600 may be a configuration for using the reference video frame (i.e., wide-angle video frame)

$$(I_t^{Ref}).$$

The cosine similarity matrix module 610 of the RAP module 600 may calculate the cosine similarity matrix between an ultra-wide-angle video frame at an arbitrary time point (t), and a reference wide-angle video frame at the arbitrary time point (t). In addition, the cosine similarity matrix module 610 may calculate the matching index map ($p_t$) and the matching confidence map ($c_t$), which are necessary in two other modules 620 and 630. Here, the matching index map may also be referred to as "index map" or "matching index" in the present disclosure. Here, the matching confidence map may also be referred to as "confidence map" or "matching confidence" in the present disclosure. Here, the matching index map may mean the index (coordinates) of the matched reference patch. What contains the confidence value (similarity) of the matched reference patch may be a confidence map.

Specifically, the cosine similarity matrix module 610 may allow the ultra-wide-angle video frame at the arbitrary time point (t) and the down-sampled ultra-wide-angle video frame at the arbitrary time point (t) to be included in the feature space through the sharing encoder VGG19 ($\phi$) which has been trained in advance for image classification task (ImageNet). That is, the feature map (hereinafter, referred to as "LR feature map") of the ultra-wide-angle video frame at the arbitrary time point (t), and the feature map (hereinafter, referred to as "Ref feature map") of the down-sampled reference wide-angle video frame may be extracted.

Thereafter, the cosine similarity matrix module 610 may extract a 3×3 patch from the LR feature map and the Ref feature map using the next stride 1, and calculate the cosine similarity matrix C between respective extracted 3×3 patches. Here, $C_{i,j}$ may be a similarity between the i-th patch of the LR feature map and the j-th patch of the Ref feature map. Here, the i-th matching index map ($p_{t,i}$) at an arbitrary time point (t) may be a patch index of the Ref feature, which is most relevant to the i-th patch of the LR feature. Here, the i-th matching confidence map ($c_{t,i}$) at an arbitrary time point (t) may mean the largest matching confidence value among $C_{i,j}$ values (that is, matching confidence).

As a result of the above, the cosine similarity matrix module 610 may generate a matching confidence map ($c_t$) at an arbitrary time point (t), and a matching index map ($p_t$) at an arbitrary time point (t).

The reference alignment module 620 may extract a temporal reference feature map $$(h_t^{Ref})$$

from the reference wide-angle video frame at the arbitrary time point (t) through the residual convolution block (not R of FIG. 6, but separate block), and warp (align) the extracted temporal reference feature as the ultra-wide-angle video frame at the arbitrary time point (t) using the index map ($p_t$). That is, the reference alignment module 620 may performing warping in order to roughly align patches of the extracted temporal reference feature map as features for the ultra-wide-angle video frame at the arbitrary time point (t). At this time, for example, in the feature space, warping may be performed in 1×1 pixel units. Lastly, the reference alignment module 620 may use a patch-wise affine spatial transformer to compensate for wrong alignment (e.g., scale and rotation) between patches in roughly aligned Ref features. As a result, the finally aligned reference feature $$(\tilde{h}_t^{Ref})$$

may be generated. That is, according to the present disclosure, it is possible to reduce an error, which may be caused by an inaccurate feature matching, using the calculated matching confidence map ($c_t$) at the time of alignment.

The propagative temporal fusion module 630 may be a module which allows the neural network 100 itself to utilize the finally aligned reference feature.

The propagative temporal fusion module 630 may fuse the temporally aggregated feature $$(\hat{h}_t^f)$$

with the finally aligned reference feature. The fused intermediate feature $$(h_t^f)$$

may be propagated to the forward cell 110 at the next time point (t+1) based on an arbitrary time point (t).

Here, reference features at the current time point, that is, an arbitrary time point (t) may be included in the aligned reference feature, but the aggregated temporal reference features, which are propagated from the adjacent forward cells, may be included in the temporally aggregated feature $$(\hat{h}_t^f).$$

The propagative temporal fusion module 630 should fuse the temporally aggregated feature $$(\hat{h}_t^f)$$

and the aligned reference feature $$(\tilde{h}_t^{Ref})$$

in a scheme that selects reference features better aligned in the ultra-wide-angle video frame intended to improve the resolution at the current time point (t) so that well-matched temporal reference features may be continually propagated to the next cell for successful fusion.

Otherwise, a wrong reference feature may be accumulated in a pipeline consisting of forward cells 110 (or backward cells 120), which may cause blurring of the ultra-wide-angle video frame generated by the neural network 100.

However, since the matching is not always accurate in the fusion of the aligned reference features, errors may easily occur. Therefore, the feature fusion may be performed according to the matching confidences ($c_t$) described above. In this way, the propagative temporal fusion module 630 may be guided only to select only well-matched features from the aligned reference features.

Further, the propagative temporal fusion module 630 needs a guideline for propagated, reference features, which are aggregated in the temporally aggregated feature $$(\hat{h}_t^f).$$

The guideline should accommodate time information that matches the propagated reference features maintained in the propagation pipeline consisting of the forward cells 110 (or backward cells 120). To this end, in the present disclosure, matching confidences are aggregate throughout the entire propagation pipeline, and the accumulated matching confidence $$(c_{t-1}^f)$$

is used as the guideline for the temporally aggregated feature during fusion.

For fusion, in the present disclosure, a matching confidence ($c_t$), which is calculated between a target frame (i.e., input ultra-wide-angle video frame) and reference frame (i.e., reference wide-angle video frame) at the present time point, i.e., at an arbitrary time point (t), may be provided, and an aligned matching confidence $$(\tilde{c}_t^f)$$

(i.e., matching confidence aligned from the warp of the cell), which is propagated from the neighbor recurrent cell (e.g., forward cell (or backward cell)), may be provided as a guideline. At this time, the matching confidences may consider the matching score of adjacent patches in order to provide a more accurate guideline while being embedded to the convolution layer and fused. The above-described fusion process may be defined as in Equation 7.

$$h_t^{\{f,b\}} = \left\{conv\left(\left[c_t, \tilde{c}_t^{\{f,b\}}\right]\right) \otimes conv\left(\left[\tilde{h}_t^{Ref}, \hat{h}_t^{\{f,b\}}\right]\right)\right\} + \hat{h}_t^{\{f,b\}} \quad \text{[Equation 7]}$$

Here, [,] represents the concatenation operation, and ⊗ represents element-wise multiplication.

For the next cell (e.g., forward cell at time point t+1, or backward cell at time point t−1), in the present disclosure, a greater confidence score can be obtained by performing max operation for $c_t$ and $$\tilde{c}_t^{\{f,b\}}.$$

The confidence map of the result may be $$c_t^f \text{ (or } c_t^b).$$

The propagative temporal fusion module 630 may selectively fuse and propagate Ref) and the features which are well-matched between the aligned reference features $$(\tilde{h}_t^{Ref})$$

and the temporally aggregated features $$(\hat{h}_t^{\{f,b\}})$$

indirectly through the max operation between ct and $$\tilde{c}_t^{\{f,b\}}.$$

The reference feature and the temporally aggregated feature of the ultra-wide-angle video frame, which is intended to improve resolution by the above-described method, are circularly integrated and are passed over to the cell at the next time point (t+1 or t−1).

The above description has been focused on the forward cell 110 (*f*), but it may also be applied to the backward cell 120 (*b*) in the same manner. At this time, it can be understood that the previous time point in the forward direction was t−1, but the previous time point in the backward direction could be t+1, and f in the reference code described above could be replaced by b.

Figure 10:
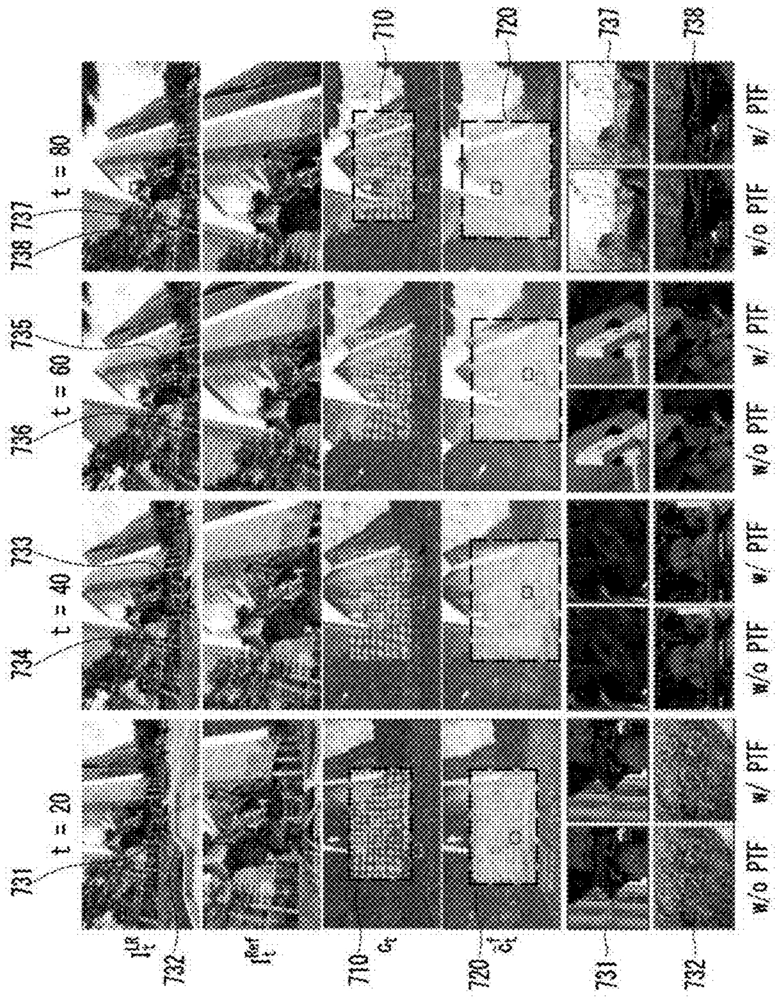
FIG. 10 is a diagram illustrating video frames for explaining the effects according to an exemplary embodiment of the present disclosure.

FIG. 10 is a diagram illustrating video frames for explaining the effects according to an exemplary embodiment of the present disclosure.

That is, FIG. 10 is a diagram showing the effects of the above-described propagative temporal fusion module 630.

The column of FIG. 10 represents time points (t=20, 40, 60, 80), and the row represents the input ultra-wide-angle video frame, the reference wide-angle video frame, matching confidence ($c_t$), and the aligned matching confidence propagated in the forward direction from the first row in regular order. The last two rows represent areas 731, 733, 735 and 737 (overlapping field of view (FoV) (i.e., the FoV of the image of the second row)) and areas 732, 734, 736 and 738 (arbitrary area outside the overlapping FoV) among the video frames of the first row. For example, the area 731 at t=20 is illustrated in the fifth row, and the area 732 is illustrated in the sixth row. Here, the column of each time point (e.g., t=20) is divided into two sub-columns. Here, the sub-column on the left side indicates the case where the propagative temporal fusion module 630 of the present disclosure is not applied, and the sub-column on the right side indicates the case where the propagative temporal fusion module 630 of the present disclosure is applied. It can be seen that the resolution of the sub-column on the right side, to which the propagative temporal fusion module 630 has been applied, is higher than that of the sub-column on the left side.

Referring to the third row representing the matching confidence ($c_t$), it can be seen that there is always a big quadrangle area 710 in the center of different time points (t=20, 40, 60, 80). The area 710 may be caused by a field of view (FoV). Since there is a camera motion in the frame of the first row, a confidence map, which reflects motion, may be generated as in the fourth row if the matching confidence ($c_t$) is continually accumulated. Referring to the fourth row, it is seen that a quadrangle area 720 is aggregate and rises and the camera also rises. That is, when using the aggregated confidence map, it is possible to bring and use reference features (i.e., reference features of wide-angle video frames used for reference), which are gathered in the center of the third row, which was aligned in the previous cell (i.e., cell at the previous time point in the forward direction and backward direction), in the cell (forward cell and backward cell) at the current time point (i.e., arbitrary time point (t=80)) by utilizing the aggregated confidence map as in the fourth row.

For example, in the cell of t=80 corresponding to the fourth column, the input frame of the neural network may be the ultra-wide-angle video frame and the wide-angle video frame which is a reference frame. At this time, the wide-angle video frame at t=60 is not given as the input of the cell at t=80. In the present disclosure, the feature for the wide-angle video frame at t=60 is aggregated in h (intermediate feature) at t=60.

The cell at t-80 does not know where the feature for the wide-angle video frame at t=60 is aggregated. However, the feature for the wide-angle video frame influences the cell of t=80. The fourth row may be a row which indicates where the feature for the wide-angle video frame is aggregated. That is, the feature for the wide-angle video frame may be accumulated in the confidence map.

Hence, when the cell at t=80 fuses h propagated at t=79, the confidence map can get a greater value. In practice, the wide-angle video frame at t=79 is not input to the cell at t=80, but it may be induced to be extracted from the aggregated feature.

Meanwhile, when performing feature matching between an ultra-wide-angle frame and a reference wide-angle frame, the similarity between all pixels of each feature is measured, and a lot of computations may be required to match reference wide-angle video frames at all time points with an ultra-wide-angle frame at an arbitrary time point, and it may be impossible to perform the actual neural network input in a GPU due to 4H HD images of a very high resolution. In order to solve the problem, the present disclosure allows a neural network at an arbitrary time point to effectively utilize the aggregated reference feature to super-resolution by aggregating information of reference wide-angle video frames in the intermediate feature $h^{\{f,b\}}$ by using a confidence map and propagating the information. Therefore, according to the present disclosure, it is possible to obtain the same effects as in using all wide-angle video frames of past time points by efficiently using intermediate features h, which have been indirectly aggregated and propagated, without performing feature matching between wide-angle video frames and ultra-wide-angle frames of past time points, for example, based on the forward cell.

Figure 11:
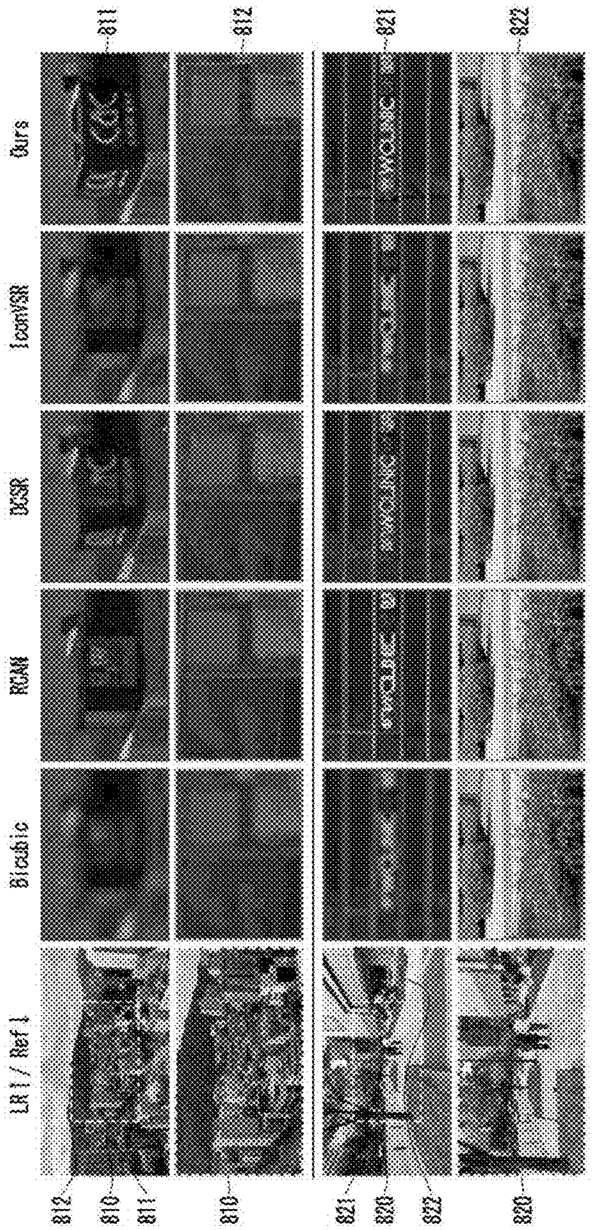
FIG. 11 is a diagram illustrating video frames for explaining the effects according to an exemplary embodiment of the present disclosure.

FIG. 11 is a diagram illustrating video frames for explaining the effects according to an exemplary embodiment of the present disclosure.

The video frames of FIG. 11 are the frames of the 8K super-resolution result video restored from Real-Word HD.

The resolution of the real-word HD may be 1080×1920, and the 8K resolution may be 4320×7280.

In FIG. 11, LR means a relatively low resolution video (e.g., ultra-wide-angle image), and Ref means a reference image (e.g., wide-angle image).

For comparison, the second column shows the result of using Bicubic model (general-purpose single image super-resolution technique) among SISR methods, the third column shows the result of using RCAN-$l_1$ model among SISR methods, the fourth column shows the result of using DCSR-$l_1$ model among RefSR methods, and the fifth column shows the result of using IconVSR-$l_{ch}$ model among VSR methods. Further, the result by application of the present disclosure is shown in the last column.

In the case of the fourth column and the fifth column, the models with the best performance for the RealMCVSR test set were selected.

The first row and the second row of FIG. 11 show the first embodiment. In the first column, the first row may be the frame of the image taken with an ultra-wide-angle camera, and the second row may be the frame of the image taken with a wide-angle camera. The frame of the second row may correspond to the overlapping area 810 (overlapping angle) in the frame of the first row. At this time, as for each result of the second to sixth columns, the first row represents the area 811 inside the overlapping area 810 in the first column/first column frames of FIG. 11, and the second row represents the area 812 outside the overlapping area 810 in the first column/first column frames of FIG. 11.

The third row and the fourth row of FIG. 11 show the second embodiment. In the first column, the third row may be the frame of the image taken with an ultra-wide-angle camera, and the fourth row may be the frame of the image taken with a wide-angle camera. The frame of the fourth row shows the overlapping area 820 in the frame of the third row. At this time, as for each result of the second to sixth columns, the third row represents the area 821 inside the overlapping area 820 in the first column/third column frames of FIG. 11, and the fourth row represents the area 822 outside the overlapping area 820 in the first column/third column frames of FIG. 11.

FIG. 11 shows that non-reference-based SR methods, such as RCAN model of the third column and IconVSR model of the fifth column, excessively exaggerate the texture, but the area other than the texture becomes too smooth in such methods. DCSR model, which is RefSR method as in the fourth column, shows a better result than RCAN model of the third column and IconVSR model of the fifth column in overlapping FoV areas 811 and 821, but DCSR model shows a low-quality super-resolution result in areas 812 and 822 outside overlapping FoV.

However, the method suggested in the present disclosure shows the best results compared to the existing methods. In particular, when compared to the DCSR model, which is the fourth column, it can be seen that the network of the present disclosure better restores details in both overlapping areas 811 and 821 inside FoV and areas 812 and 822 outside FoV.

Figure 12:
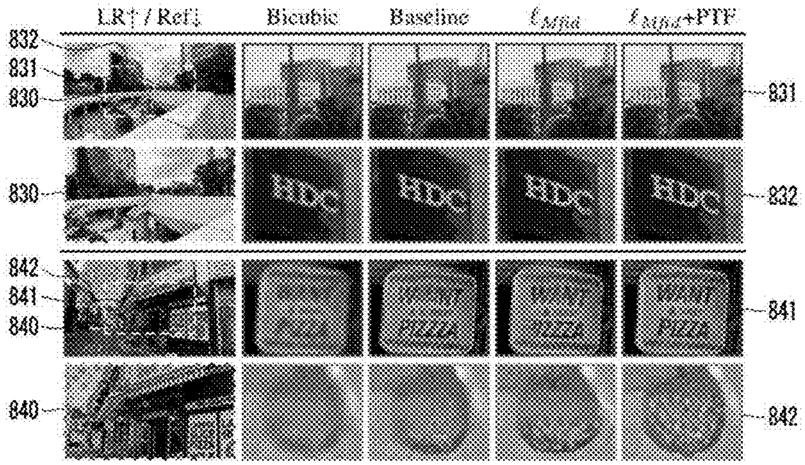
FIG. 12 shows effects when using the second loss function and the propagative temporal fusion module according to an exemplary embodiment of the present disclosure.

FIG. 12 shows effects when using the second loss function and the propagative temporal fusion module according to an exemplary embodiment of the present disclosure.

The above table (first table) of FIG. 12 shows the effect after the first supervised learning is completed, and the lower table (second table) of FIG. 12 shows a matrix of video frames for explaining the effect after the second supervised learning is completed.

In the first table of FIG. 12, the first column denotes the second loss function (IMfid) described above, the second column denotes the above-described propagative temporal fusion module (PTF module) 630, the third column denotes peak signal-to-noise ratio (PSNR), the fourth column denotes structural similarity index map (SSIM), and the fifth column denotes parameters (Params). Here, PSNR and SSIM may be an item that indicates image quality. Here, the parameter may mean the total capacity (megabyte) of a network (e.g., the total sum of the convolution kernels of a network). The higher the parameter, the more likely the network is to achieve better performance.

In the first table of FIG. 12, the first row represents values for the base model (model which does not use reference), the second row represents values when using only the second loss function (current reference) of the present disclosure, and the third row represents values when using the second loss function and the propagative temporal fusion module 630.

When comparing the first row with the second row, the parameters (the capacities of the network) are completely the same, but the performance (PSNR, SSIM) is increasing, showing the effect of $L_{Mfid}$. Meanwhile, when comparing the second row with the third row, the difference between the parameters (the capacities of the network) is only 0.0004 MB (very little difference), but the performance (PSNR, SSIM) is increasing significantly, so the effect of the PTF module 630 is also shown.

In the second table of FIG. 12, LR means a relatively low resolution video, and the Ref means a reference video.

The first column represents the ultra-wide-angle video frame (LR) and the wide-angle video frame (Ref) of the first embodiment, and the ultra-wide-angle video frame (LR) and the wide-angle video frame (Ref) of the second embodiment, in order. The areas 830 and 840 in the first row and the third row of the super wide-angle video frames show the field of view (FoV) overlapping with the wide-angle video frames.

For comparison, the second column shows the result of using Bicubic model. In the third to fifth columns, in the case of the baseline model, which is the first row of the first table of FIG. 12, when the second loss function is added to the baseline model of the second row, the enlarged 4×SR result of the case, in which the second loss function and the propagative temporal fusion module 630 is added to the baseline model of the third row, is shown.

Areas 831, 841 and areas 832, 842 represent the inner side and the outer side of FoV, which overlap between the ultra-wide-angle video frame (LR) and the reference wide-angle video frame (Ref), respectively.

That is, for each result of the second to fifth columns, the first row represents the area 831 in the frame of the first column/first row of the second table of FIG. 12, and the second row represents the area 832 in the frame of the first column/first row in the second table of FIG. 12. In addition, for each result of the second to fifth columns, the third row represents the area 841 in the frame of the first column/third row of the second table of FIG. 12, and the fourth row represents the area 842 in the frame of the first column/third row in the second table of FIG. 12.

The network of the present disclosure better restores details in both areas inside and outside overlapping FoV as getting closer to the fifth column from the second column. In particular, it is seen that details are better restored when using the second loss function and the propagative temporal fusion module 530 than the fourth column to which only the second loss function is applied.

FIG. 13 is a table showing a comparison of performance with the conventional technologies according to an exemplary embodiment of the present disclosure.

FIG. 13 shows a quantitative comparison between the method according to the present disclosure and conventional methods. The network of the present disclosure was trained using loss function $l_1$ for fare comparison with the existing methods learned using pixel-based loss functions such as $l_1$, $l_2$ and $l_{ch}$ which are known to be advantageous in PSNR than perceptual-based loss. Further, the network (Ours+IR+$l_1$), which uses information-refill (IR) and the propagative temporal fusion module in the present disclosure (Ours), was learned and used for comparison in consideration of the trade-off between the model size and the super-resolution performance.

RefSR method shows better performance than single image super-resolution (SISR) method, but the method according to the present disclosure shows better performance than all the existing methods. At this time, it can be seen that the VSR method shows better performance than the RefSR to which additional reference frames are input. However, if the performance in the area of the result super-resolution frame corresponding to another FoV range is measured, it is not true. Table of FIG. 14 shows the result.

FIG. 14 is a table showing a comparison of the quantitative results measured in another FOV range as a comparison of the conventional technique and the present disclosure according to an exemplary embodiment of the present disclosure.

The table in FIG. 14 shows the results of measuring the super-resolution performance for the area inside the overlapping FoV (0 to 50%) between the ultra-wide-angle super-resolution video frame and the wide-angle reference video frame, and the super-resolution performance for certain areas of different FoVs ranging from the overlapping FoV (50%) to the entire FoV (100%).

The RefSR method shows better performance than the VSR method in the FoV (0 to 50%) area where the input overlaps with the reference video frame, but in the remaining areas, the VSR method shows better performance than the RefSR method. However, it can be seen that the method suggested in the present disclosure shows the performance that surpasses all models in all areas.

As shown in FIG. 14, in the neural network of the present disclosure, there is a difference in performance between the overlapping FoV inner area (0 to 50%) and the outer area (50 to 100%). However, when compared with the PSNR/SSIM difference (8.5%/4.2%) of DCSR, the network shows a relatively small performance difference (Ours−: 4.3%/1.8%, Ours+IR+: 4.2%/1.6%). This result implies that the time reference feature is efficiently used to restore the inner area of the FoV, in which the network suggested in the present disclosure overlaps, as well as the outer area.

Here, the performance reduction amount (%) of the outer area compared to the inner area of the FOV is calculated as follows. For example, the difference between DCSR and PSNR may be calculated as (1−(31.93(50~100%)/34.90 (0~50%)))*100=8.5%. The difference between DCSR and SSIM may be calculated as (1−(0.923/0.963))*100=4.2%.

Figure 15:
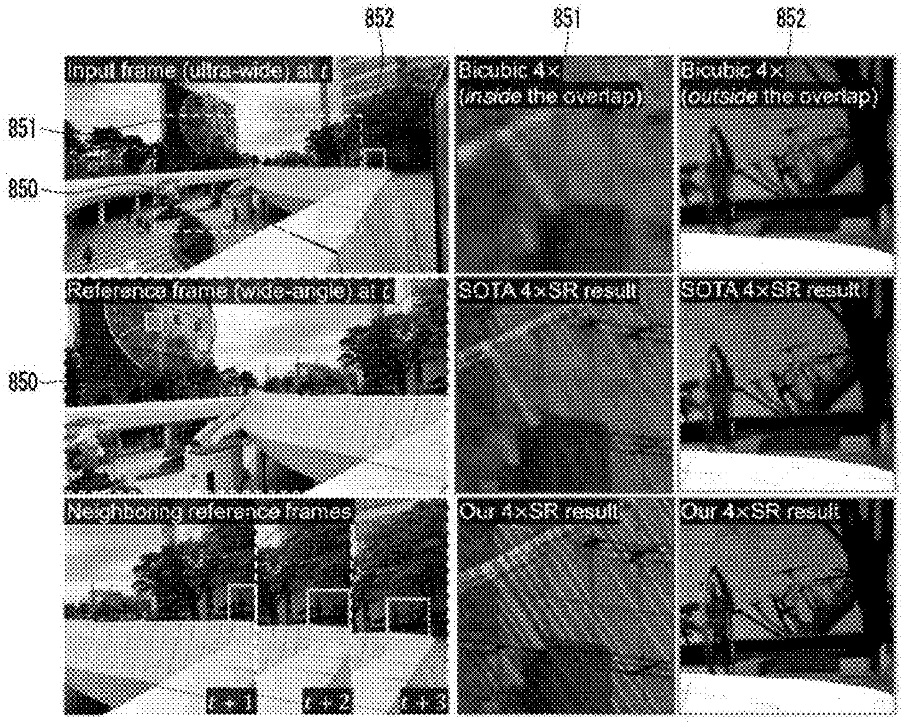
FIG. 15 is a diagram for comparing the performance of the prior art with the performance of the present disclosure.

FIG. 15 is a diagram for comparing the performance of the prior art with the performance of the present disclosure.

The first row of the first column represents an input frame (i.e., ultra-wide-angle video frame) at an arbitrary time point (t), the second row represents a reference frame (i.e., wide-angle video frame) at an arbitrary time point (t), and the third row represents neighboring reference frames at following time points (t+1, t+2, t+3) based on an arbitrary time point (t).

The second and third columns of the first row show the result of the Bicubic approach. The second and third columns of the second row show the result of the most advanced (SOTA 8K 4×SR) RefSR approach. The second and third columns of the third row show the result of the RefVSR approach (Our 8K 4×SR) of the present disclosure.

The second column shows the conventional technology and the result of the present disclosure for the area 851 inside the area 850 which overlaps in the ultra-wide-angle video frame of the first row. Further, the third column shows the result of the prior art and the present disclosure for the overlapping area 850 and the outer area 852.

As shown in the third row, in the present disclosure, a method of improving the resolution of a LR ultra-wide-angle video frame of a relatively low resolution is learned by utilizing a high-quality patch related to the reference frame, and a clear texture of the overlapping FoV inside and outside between the input ultra-wide-angle video frame and reference wide-angle video frame 850 is strongly restored.

Here, the reference wide-angle video frame and the ultra-wide-angle video frame at the arbitrary time point (t) share almost the same content in the overlapping FoV 850. In addition, since the images show movements, adjacent reference wide-angle video frames (i.e., video frames at time points t+1, t+2, and t+3) may include high-quality contents which are useful for restoring the overlapping external side.

Figure 16:
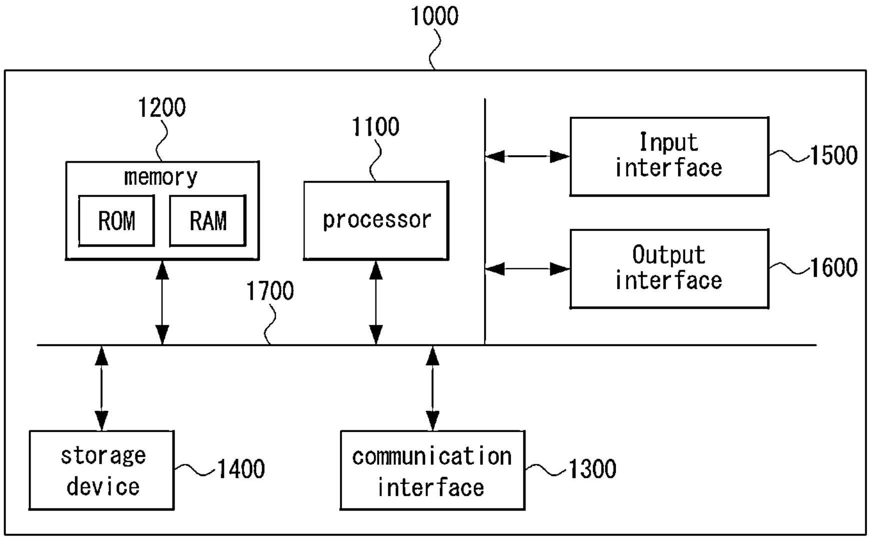
FIG. 16 is a conceptual diagram illustrating an example of a super-resolution video generation device or computing system, which utilizes a generalized multi-camera video including a neural network capable of performing at least part of the process of FIGS. 1 to 9.

FIG. 16 is a conceptual diagram illustrating an example of a super-resolution video generation device or computing system, which utilizes a generalized multi-camera video including a neural network capable of performing at least part of the process of FIGS. 1 to 9.

At least a part of the process of a method of generating a super-resolution video using a multi-camera video according to an exemplary embodiment of the present disclosure, and the above-described two-step supervised learning method may be performed by the computing system 1000 of FIG. 16.

Referring to FIG. 16, the computing system 1000 according to an exemplary embodiment of the present disclosure may be configured to include a processor 1100, a memory 1200, a communication interface 1300, a storage device 1400, an input interface 1500, an output interface 1600, and a bus 1700.

The computing system 1000 according to an exemplary embodiment of the present disclosure may include at least one processor 1100, and a memory which stores instructions instructing the at least one processor 1100 to perform at least one step. At least some steps of the method according to an exemplary embodiment of the present disclosure may be performed as the at least one processor 1100 loads instructions from the memory 1200 and executes the instructions.

The processor 1100 may a central processing unit (CPU), a graphics processing unit (GPU), or a dedicated processor in which methods according to exemplary embodiments of the present disclosure are performed.

Each of the memory 1200 and the storage device 1400 may be composed of at least one of volatile storage and nonvolatile storage media. For example, the memory 1200 may be composed of at least one of a read only memory (ROM) and a random access memory (RAM).

In addition, the computing system 1000 may include a communication interface 1300 performing communication through a wireless network.

In addition, the computing system 1000 may further include a storage device 1400, an input interface 1500, an output interface 1600, and the like.

In addition, each component included in the computing system 1000 may be connected by the bus 1700 to communicate with each other.

Some examples of the computing system 1000 of the present disclosure may include a desktop computer, a laptop computer, a smartphone, a tablet PC, a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, and a personal digital assistant (PDA), which can be communicated.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for generating a super-resolution video by using a multi-camera video, the method comprising:

generating a resolution-improved ultra-wide-angle video frame at an arbitrary time step by inputting an ultra-wide-angle video frame of a first resolution at the arbitrary time step, ultra-wide-angle video frames right before and right after the arbitrary time step, and a wide-angle video frame for reference at the arbitrary time step, to a bidirectional neural network, wherein the generating of the resolution-improved ultra-wide-angle video frame is performed using accumulated information at a past time step based on the arbitrary time step, and accumulated information at a future time step based on the arbitrary time step, wherein a second resolution, which is a resolution of the generated resolution-improved ultra-wide-angle video frame, is greater than the first resolution, wherein the bidirectional neural network includes a forward cell and a backward cell, wherein in an operation of calculating the forward cell, a forward propagation intermediate feature and a forward propagation confidence map, which are accumulated information of the past time step, are delivered to the forward cell, and ultra-wide-angle video frames of the first resolution at the arbitrary time step, and time steps right before and right after the arbitrary time step, and the wide-angle video frame at the arbitrary time step are input to the forward cell, and the forward propagation intermediate feature and the forward propagation confidence map are at the arbitrary time step are calculated and output, and wherein in an operation of calculating the backward cell, a backward propagation intermediate feature and a backward propagation confidence map, which are accumulated information of the future time step, are delivered to the backward cell, and ultra-wide-angle video frames at the arbitrary time step, and time steps right before and right after the arbitrary time step, and the wide-angle video frame at the arbitrary time step are input to the backward cell, and the backward propagation intermediate feature and the backward propagation confidence map are at the arbitrary time step are calculated and output.

2. The method of claim 1, wherein the bidirectional neural network is trained by a two-step supervised learning scheme, and wherein the method comprises:

training the bidirectional neural network, by an advance supervised learning scheme, to allow the bidirectional neural network to generate the resolution-improved ultra-wide-angle video frame of the second resolution at the arbitrary time step, by inputting ultra-wide-angle video frames at the arbitrary time step and time steps right before and right after the arbitrary time step, which have been down-sampled by predetermined scaling factors, and the wide-angle video frame at the arbitrary time step to the bidirectional neural network; and training the trained bidirectional neural network, by an adaptive supervised learning scheme, to allow the bidirectional neural network to generate the resolution-improved ultra-wide-angle video frame of the second resolution at the arbitrary time step, by inputting ultra-wide-angle video frames of the first resolution at the arbitrary time step and time steps right before and right after the arbitrary time step, and the wide-angle video frame at the arbitrary time step to the trained bidirectional neural network.

3. The method of claim 2, wherein the training of the bidirectional neural network by the advance supervised learning scheme comprises:

training the bidirectional neural network to output an ultra-wide-angle video frame of the second resolution by inputting ultra-wide-angle video frames at the arbitrary time step and time steps right before and right after the arbitrary time step, which have been down-sampled by the predetermined scaling factors, and the wide-angle video frame at the arbitrary time step, to the bidirectional neural network, using a down-sampled wide-angle video frame, which is generated by down-sampling the wide-angle video frame at the arbitrary time step by second predetermined scaling factors, as a second ground truth, and wherein the training of the bidirectional neural network by the advance supervised learning scheme comprises:

generating a second loss function value by comparing the ultra-wide-angle video frame at the arbitrary time step, which is output by the bidirectional neural network, with the second ground truth; and providing the second loss function value to the bidirectional neural network.

4. The method of claim 3, wherein the training of the bidirectional neural network by the advance supervised learning scheme further comprises:

training the bidirectional neural network to output an ultra-wide-angle video frame of the second resolution by inputting ultra-wide-angle video frames at the arbitrary time step and time steps right before and right after the arbitrary time step, which have been down-sampled by the predetermined scaling factors, and the wide-angle video frame at the arbitrary time step, to the bidirectional neural network, using the ultra-wide-angle video frame at the arbitrary time step, as a first ground truth, and wherein the training of the bidirectional neural network by the advance supervised learning scheme comprises:

generating a first loss function value by comparing the ultra-wide-angle video frame at the arbitrary time step, which is output by the bidirectional neural network, with the first ground truth; and providing the first loss function value to the bidirectional neural network.

5. The method of claim 2, wherein the training of the bidirectional neural network by the adaptive supervised learning scheme comprises:

training the trained bidirectional neural network to output an ultra-wide-angle video frame of the second resolution by inputting ultra-wide-angle video frames at the arbitrary time step and time steps right before and right after the arbitrary time step, and the wide-angle video frame at the arbitrary time step, to the bidirectional neural network, using the ultra-wide-angle video frame of the first resolution at the arbitrary time step, as a third ground truth, and wherein the training of the bidirectional neural network by the adaptive supervised learning scheme comprises:

down-sampling the ultra-wide-angle video frame at the arbitrary time step, which is output by the trained bidirectional neural network, by the predetermined scaling factors;

generating a third loss function value by comparing the down-sampled ultra-wide-angle video frame with the third ground truth; and providing the third loss function value to the bidirectional neural network.

6. The method of claim 2, wherein the training of the trained bidirectional neural network by the adaptive supervised learning scheme comprises:

training the trained bidirectional neural network to output an ultra-wide-angle video frame of the second resolution by inputting ultra-wide-angle video frames at the arbitrary time step and time steps right before and right after the arbitrary time step, and the wide-angle video frame at the arbitrary time step, to the bidirectional neural network, using a telephoto video frame at the arbitrary time step, as a fourth ground truth, and wherein the training of the bidirectional neural network by the adaptive supervised learning scheme comprises:

generating a fourth loss function value by comparing the ultra-wide-angle video frame at the arbitrary time step with the fourth ground truth; and providing the fourth loss function value to the bidirectional neural network.

7. The method of claim 1, wherein the bidirectional neural network further includes an upsampling module, and wherein in an operation of generating an ultra-wide-angle video frame of the second resolution by the upsampling module, the forward propagation intermediate feature, the forward propagation confidence map, the backward propagation intermediate feature, and the backward propagation confidence map at the arbitrary time step are input to the upsampling module, and the upsampling module generates the ultra-wide-angle video frame of the second resolution.

8. The method of claim 1, wherein the forward propagation intermediate feature among information accumulated at the past time step, and the backward propagation intermediate feature among information accumulated at the future time step are values aggregated in the forward cell and the backward cell of all time steps before the arbitrary time step, respectively, and wherein an ultra-wide-angle feature for the ultra-wide-angle video frame of the first resolution of each time step, and a wide-angle feature for the wide-angle video frame of each time step are fused and aggregated in the forward propagation intermediate feature and the backward propagation intermediate feature.

9. The method of claim 1, wherein the forward propagation confidence map among information accumulated at the past time step, and the backward propagation confidence map among information accumulated at the future time step are values aggregated in the forward cell and the backward cell of all time steps before the arbitrary time step, respectively.

10. A device for generating a super-resolution video by using a multi-camera video, the device comprising:

a processor; and a bidirectional neural network, wherein the processor generates a resolution-improved ultra-wide-angle video frame sequence at an arbitrary time step by inputting an ultra-wide-angle video frame of a first resolution at the arbitrary time step, ultra-wide-angle video frames right before and right after the arbitrary time step, and a wide-angle video frame for reference at the arbitrary time step, to the bidirectional neural network, wherein, when generating the resolution-improved ultra-wide-angle video frame sequence, the processor generates the resolution-improved ultra-wide-angle video frame sequence using accumulated information of a past time step and a future time step based on an arbitrary time step, wherein a second resolution, which is a resolution of the generated resolution-improved ultra-wide-angle video frame sequence, is greater than the first resolution, wherein the bidirectional neural network includes a forward cell and a backward cell, wherein the processor is configured to allow a forward propagation intermediate feature and a forward propagation confidence map, which are accumulated information of the past time step, to be delivered to the forward cell, and ultra-wide-angle video frames of the first resolution at the arbitrary time step, and time steps right before and right after the arbitrary time step, and the wide-angle video frame at the arbitrary time step to be input to the forward cell, and allow the forward cell to calculate and output the forward propagation intermediate feature and the forward propagation confidence map at the arbitrary time step, and wherein the processor is configured to allow a backward propagation intermediate feature and a backward propagation confidence map, which are accumulated information of the future time step, to be delivered to the backward cell, and ultra-wide-angle video frames at the arbitrary time step, and time steps right before and right after the arbitrary time step, and the wide-angle video frame at the arbitrary time step to be input to the backward cell, and allow the backward cell to calculate and output the backward propagation intermediate feature and the backward propagation confidence map at the arbitrary time step.

11. The device of claim 10, wherein the processor is configured to:

train the bidirectional neural network, by an advance supervised learning scheme, to allow the bidirectional neural network to generate the resolution-improved ultra-wide-angle video frame sequence of the second resolution at the arbitrary time step, by inputting ultra-wide-angle video frames at the arbitrary time step and time steps right before and right after the arbitrary time step, which have been down-sampled by predetermined scaling factors, and the wide-angle video frame at the arbitrary time step to the bidirectional neural network; and train the trained bidirectional neural network, by an adaptive supervised learning scheme, to allow the bidirectional neural network to generate the resolution-improved ultra-wide-angle video frame sequence of the second resolution at the arbitrary time step, by inputting ultra-wide-angle video frames of the first resolution at the arbitrary time step and time steps right before and right after the arbitrary time step, and the wide-angle video frame at the arbitrary time step to the trained bidirectional neural network.

12. The device of claim 11, wherein in the advance supervised learning scheme of the bidirectional neural network, the processor trains the bidirectional neural network to output an ultra-wide-angle video frame sequence of the second resolution by inputting ultra-wide-angle video frames at the arbitrary time step and time steps right before and right after the arbitrary time step, which have been down-sampled by the predetermined scaling factors, and the wide-angle video frame at the arbitrary time step, to the bidirectional neural network, using a down-sampled wide-angle video frame, which is generated by down-sampling the wide-angle video frame at the arbitrary time step by second predetermined scaling factors, as a second ground truth, and wherein when the processor trains the bidirectional neural network by the advance supervised learning scheme, the processor is configured to:

generate a second loss function value by comparing the ultra-wide-angle video frame at the arbitrary time step, which is output by the bidirectional neural network, with the second ground truth; and provide the second loss function value to the bidirectional neural network.

13. The device of claim 12, wherein in the advance supervised learning scheme of the bidirectional neural network, the processor is configured to allow the bidirectional neural network to output an ultra-wide-angle video frame of the second resolution by inputting ultra-wide-angle video frames at the arbitrary time step and time steps right before and right after the arbitrary time step, which have been down-sampled by the predetermined scaling factors, and the wide-angle video frame at the arbitrary time step, to the bidirectional neural network, using the ultra-wide-angle video frame at the arbitrary time step, as a first ground truth, and wherein when the processor trains the bidirectional neural network by the advance supervised learning scheme, the processor is configured to:

generate a first loss function value by comparing the ultra-wide-angle video frame at the arbitrary time step, which is output by the bidirectional neural network, with the first ground truth; and provide the first loss function value to the bidirectional neural network.

14. The device of claim 11, wherein in an operation of training the trained bidirectional neural network by the adaptive supervised learning scheme, the processor is configured to allow the trained bidirectional neural network to output an ultra-wide-angle video frame of the second resolution by inputting ultra-wide-angle video frames at the arbitrary time step and time steps right before and right after the arbitrary time step, and the wide-angle video frame at the arbitrary time step, to the bidirectional neural network, using the ultra-wide-angle video frame of the first resolution at the arbitrary time step, as a third ground truth, and wherein when the processor trains the trained bidirectional neural network by the adaptive supervised learning scheme, the processor is configured to:

down-sample the ultra-wide-angle video frame at the arbitrary time step, which is output by the trained bidirectional neural network, by the predetermined scaling factors;

generate a third loss function value by comparing the down-sampled ultra-wide-angle video frame with the third ground truth; and provide the third loss function value to the bidirectional neural network.

15. The device of claim 14, wherein in an operation of training the trained bidirectional neural network by the adaptive supervised learning scheme, the processor is configured to train the trained bidirectional neural network to output an ultra-wide-angle video frame of the second resolution by inputting ultra-wide-angle video frames at the arbitrary time step and time steps right before and right after the arbitrary time step, and the wide-angle video frame at the arbitrary time step, to the bidirectional neural network, using a telephoto video frame at the arbitrary time step, as a fourth ground truth, and wherein when the processor trains the bidirectional neural network by the adaptive supervised learning scheme, the processor is configured to:

generate a fourth loss function value by comparing the ultra-wide-angle video frame at the arbitrary time step with the fourth ground truth; and provide the fourth loss function value to the bidirectional neural network.

16. The device of claim 10, wherein the bidirectional neural network further includes an upsampling module, and wherein when the processor controls the upsampling module to generate an ultra-wide-angle video frame of the second resolution, which is resolution-improved by predetermined scaling factors, the forward propagation intermediate feature, the forward propagation confidence map, the backward propagation intermediate feature, and the backward propagation confidence map at the arbitrary time step are input to the upsampling module to generate the ultra-wide-angle video frame of the second resolution.

17. The device of claim 10, wherein the forward propagation intermediate feature among information accumulated at the past time step, and the backward propagation intermediate feature among information accumulated at the future time step are values aggregated in the forward cell and the backward cell of all time steps before the arbitrary time step, respectively, and wherein an ultra-wide-angle feature for the ultra-wide-angle video frame of the first resolution of each time step, and a wide-angle feature for the wide-angle video frame of each time step are fused and aggregated in the forward propagation intermediate feature and the backward propagation intermediate feature.

18. The device of claim 10, wherein the forward propagation confidence map among information accumulated at the past time step, and the backward propagation confidence map among information accumulated at the future time step are values aggregated in the forward cell and the backward cell of all time steps before the arbitrary time step, respectively.

* * * * *